(12) United States Patent
Martinelli et al.

(10) Patent No.: US 7,539,371 B2
(45) Date of Patent: May 26, 2009

(54) OPTICAL APPARATUS WITH REDUCED EFFECT OF MIRROR EDGE DIFFRACTION

(75) Inventors: Massimo Martinelli, Santa Clara, CA (US); Long Yang, Union City, CA (US); Mark H. Garrett, Morgan Hill, CA (US); Robert Ostrom, Fremont, CA (US); Joseph E. Davis, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 12/107,014

(22) Filed: Apr. 21, 2008

(65) Prior Publication Data

US 2008/0266637 A1    Oct. 30, 2008

Related U.S. Application Data

(63) Continuation-in-part of application No. 11/469,394, filed on Aug. 31, 2006, now Pat. No. 7,362,930, and a continuation-in-part of application No. 11/317,450, filed on Dec. 22, 2005, now Pat. No. 7,346,234, and a continuation-in-part of application No. 11/104,143, filed on Apr. 11, 2005, now Pat. No. 7,352,927.

(51) Int. Cl.
    *G02B 6/26* (2006.01)
(52) U.S. Cl. .................. 385/18; 385/16; 385/17; 385/19
(58) Field of Classification Search .......... 385/16, 385/18–20, 27, 34, 37, 47, 33, 24–25; 398/156; 359/290–293
See application file for complete search history.

(56) References Cited

U.S. PATENT DOCUMENTS

| | | | |
|---|---|---|---|
| 5,629,790 A | 5/1997 | Neukermans et al. | 359/198 |
| 5,745,271 A | 4/1998 | Ford et al. | 398/87 |
| 5,835,458 A | 11/1998 | Bischel et al. | 369/44.12 |
| 5,868,480 A | 2/1999 | Zeinali | 353/31 |
| 5,960,133 A | 9/1999 | Tomlinson | 385/18 |
| 5,974,207 A | 10/1999 | Aksyuk et al. | 385/24 |
| 6,172,777 B1 | 1/2001 | Flood et al. | 359/10 |
| 6,193,376 B1 | 2/2001 | Hayashi et al. | 353/30 |

(Continued)

OTHER PUBLICATIONS

U.S. Appl. No. 11/469,394 to Joseph E. Davis et al., filed Aug. 31, 2006.

(Continued)

*Primary Examiner*—Brian Healy
*Assistant Examiner*—Guy G Anderson
(74) *Attorney, Agent, or Firm*—Joshua D. Isenberg; JDI Patent

(57) ABSTRACT

A micromirror for use in an optical apparatus may comprise a reflective portion, configured to be rotatable about a switching axis and an attenuation axis that is different from the switching axis. The reflective portion may include an edge that is substantially parallel to the attenuation axis. The edge may include one or more edge features that protrude above a plane of the micromirror surface and/or are submerged below the plane of the micromirror surface, and/or have an edge shape that deviates from a straight line. Alternatively, an array of micromirrors may have mirrors characterized by sawtooth features disposed along edges that are substantially parallel to the attenuation axis.

50 Claims, 14 Drawing Sheets

U.S. PATENT DOCUMENTS

| | | | |
|---|---|---|---|
| 6,204,946 B1 | 3/2001 | Aksyuk et al. | 398/9 |
| 6,205,269 B1 | 3/2001 | Morton | 385/24 |
| 6,222,954 B1 | 4/2001 | Riza | 385/18 |
| 6,259,841 B1 | 7/2001 | Bhagavatula | 385/47 |
| 6,263,127 B1 | 7/2001 | Dragone et al. | 385/24 |
| 6,263,135 B1 | 7/2001 | Wade | 385/37 |
| 6,289,155 B1 | 9/2001 | Wade | 385/37 |
| 6,307,657 B1 | 10/2001 | Ford | 398/9 |
| 6,327,398 B1 | 12/2001 | Solgaard et al. | 385/18 |
| 6,343,862 B1 | 2/2002 | Sawai et al. | 353/1 |
| 6,345,133 B1 | 2/2002 | Morozov | 385/24 |
| 6,381,387 B1 | 4/2002 | Wendland, Jr. | 385/37 |
| 6,415,073 B1 | 7/2002 | Cappiello et al. | 385/24 |
| 6,418,250 B1 | 7/2002 | Corbosiero et al. | 385/24 |
| 6,439,728 B1 | 8/2002 | Copeland | 359/515 |
| 6,453,087 B2 | 9/2002 | Frish et al. | 385/24 |
| 6,549,699 B2 * | 4/2003 | Belser et al. | 385/24 |
| 6,625,346 B2 | 9/2003 | Wilde | 385/24 |
| 6,634,810 B1 | 10/2003 | Ford et al. | 398/88 |
| 6,647,172 B2 | 11/2003 | Giles et al. | 385/24 |
| 6,657,770 B2 | 12/2003 | Marom et al. | 359/290 |
| 6,661,393 B2 | 12/2003 | Tegreene et al. | 345/7 |
| 6,661,945 B2 | 12/2003 | Tedesco et al. | 385/24 |
| 6,661,948 B2 | 12/2003 | Wilde | 385/24 |
| 6,687,431 B2 | 2/2004 | Chen et al. | 385/24 |
| 6,695,457 B2 | 2/2004 | Drieenhuizen et al. | 359/872 |
| 6,704,476 B2 | 3/2004 | Ford et al. | 385/18 |
| 6,757,458 B2 | 6/2004 | Neilson et al. | 385/18 |
| 6,760,511 B2 | 7/2004 | Garrett et al. | 385/24 |
| 6,771,855 B2 | 8/2004 | Pezeshki et al. | 385/31 |
| 6,798,941 B2 * | 9/2004 | Smith et al. | 385/18 |
| 6,820,988 B2 | 11/2004 | Drieenhuizen et al. | 359/872 |
| 6,845,195 B2 | 1/2005 | Tedesco | 385/37 |
| 6,862,127 B1 * | 3/2005 | Ishii | 359/291 |
| 6,958,861 B1 | 10/2005 | Argueta-Diaz | 359/618 |
| 6,975,785 B2 | 12/2005 | Ghandi et al. | 385/16 |
| 7,062,120 B2 | 6/2006 | Shiozaki et al. | 385/18 |
| 7,162,115 B2 * | 1/2007 | Brophy et al. | 385/16 |
| 7,236,660 B2 | 6/2007 | Ducellier | 385/24 |
| 7,245,415 B2 * | 7/2007 | Pan | 359/291 |
| 7,346,234 B2 | 3/2008 | Davis et al. | 385/18 |
| 7,352,927 B2 | 4/2008 | Davis et al. | 385/18 |
| 7,362,930 B2 | 4/2008 | Davis et al. | 385/18 |
| 2002/0176657 A1 | 11/2002 | Burke et al. | 385/18 |
| 2003/0095307 A1 | 5/2003 | Moon et al. | 398/45 |
| 2004/0160687 A1 | 8/2004 | Van Drieenhuizen et al. | 359/872 |
| 2004/0208468 A1 | 10/2004 | Sufleta et al. | 385/140 |
| 2004/0252938 A1 | 12/2004 | Ducellier et al. | 385/27 |
| 2005/0074204 A1 | 4/2005 | Wilson et al. | 385/24 |
| 2006/0093256 A1 | 5/2006 | Yamashita et al. | 385/18 |
| 2006/0093257 A1 | 5/2006 | Aota et al. | 385/18 |
| 2006/0140536 A1 | 6/2006 | Aota et al. | 385/18 |
| 2006/0228070 A1 | 10/2006 | Davis et al. | 385/16 |
| 2006/0228071 A1 | 10/2006 | Davis et al. | 385/16 |
| 2006/0245030 A1 | 11/2006 | Pan | 359/291 |
| 2007/0166034 A1 | 7/2007 | Tremaine | 398/45 |

OTHER PUBLICATIONS

U.S. Appl. No. 11/840,182 to Mark H. Garrett, filed Aug. 16, 2007.

"The International Search Report" and "The Written Opinion of the International Searching Authority" for International application No. PCT/US2006/024075.

"The International Search Report" and "The Written Opinion of the International Searching Authority" for International application No. PCT/US2006/008639.

"The International Search Report" and "The Written Opinion of the International Searching Authority" for International application No. PCT/US2006/043169.

Non-Final Office Action dated Jan. 4, 2007 for U.S. Appl. No. 11/104,143, 16 pages.

Final Office Action dated Apr. 9, 2007 for U.S. Appl. No. 11/104,143, 16 pages.

Final Office Action dated Jun. 20, 2007 for U.S. Appl. No. 11/104,143, 18 pages.

Notice of Allowance and Fee(s) Due dated Oct. 22, 2007 for U.S. Appl. No. 11/104,143, 6 pages.

Non-Final Office Action dated Jul. 11, 2007 for U.S. Appl. No. 11/317,450, 14 pages.

Notice of Allowance and Fee(s) Due dated Oct. 5, 2007 for U.S. Appl. No. 11/317,450, 13 pages.

Notice of Allowance and Fee(s) Due dated Dec. 4, 2007 for U.S. Appl. No. 11/317,450, 8 pages.

Notice of Allowance and Fee(s) Due dated Dec. 26, 2007 for U.S. Appl. No. 11/469,394, 13 pages.

* cited by examiner

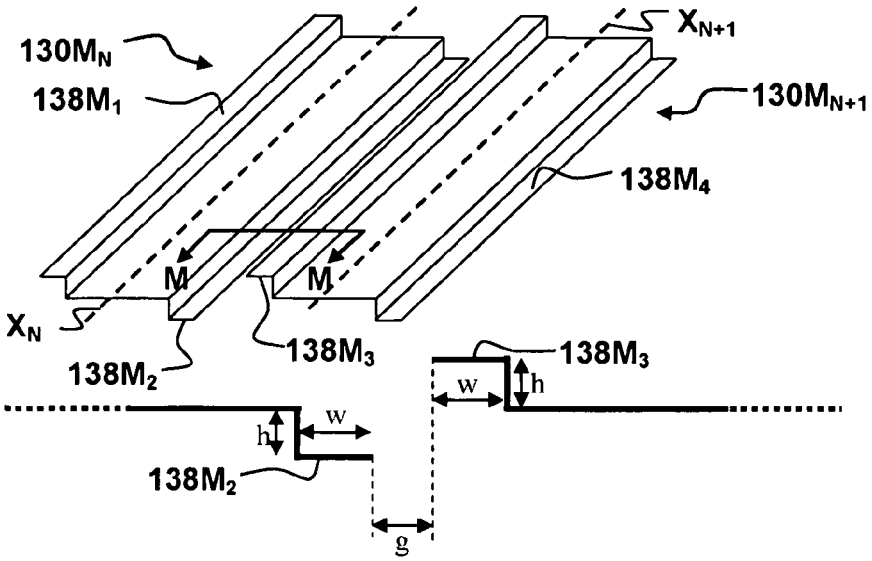
Figure 9C
Figure 9D
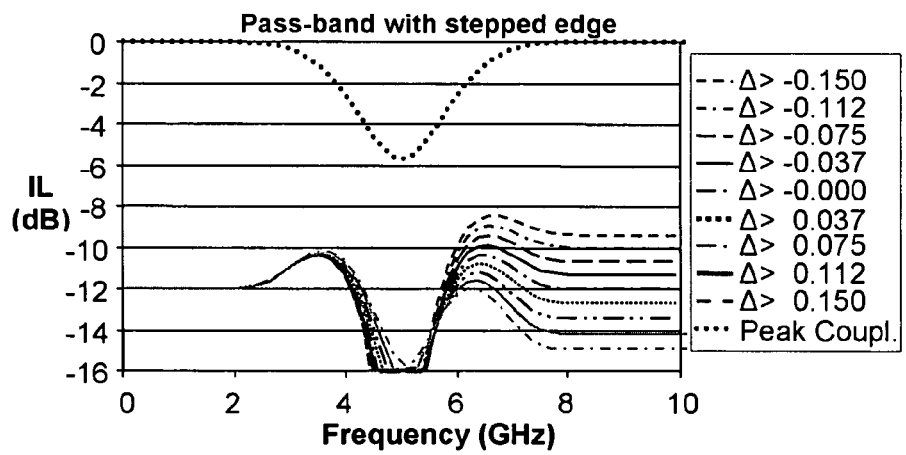
Figure 9E
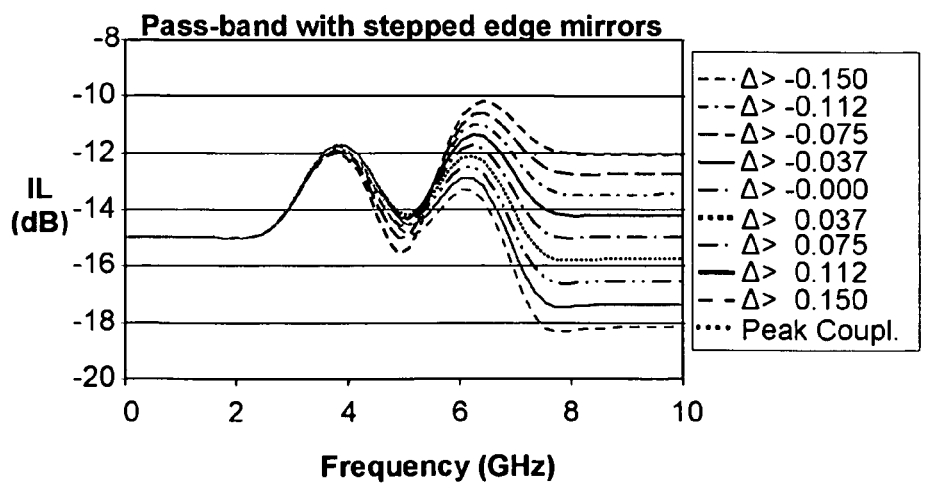
Figure 9F

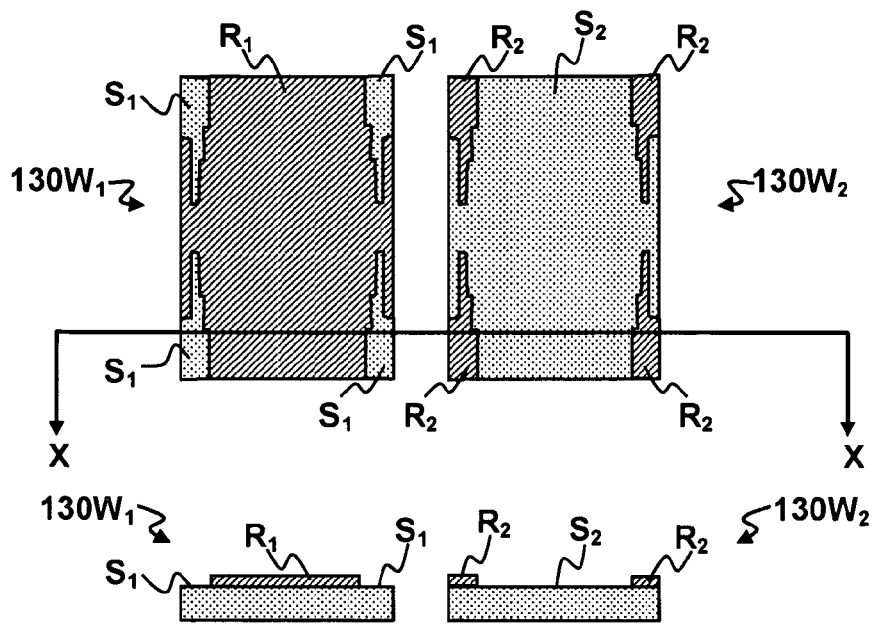
Figure 9N
Figure 9O
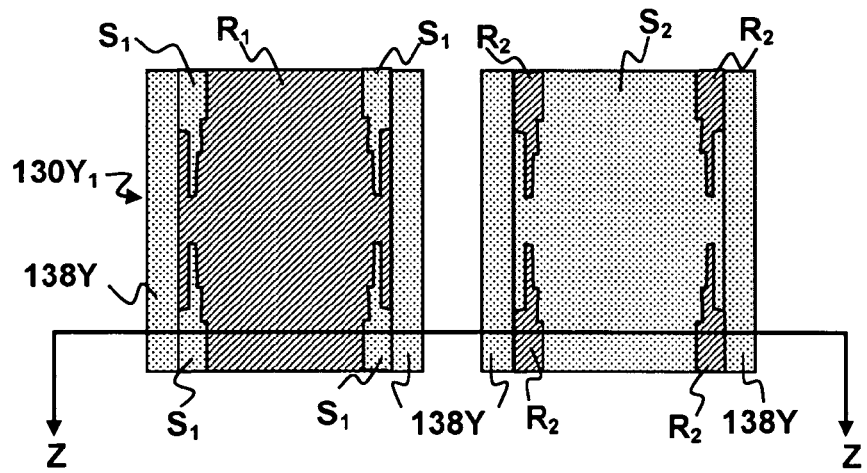
Figure 9P
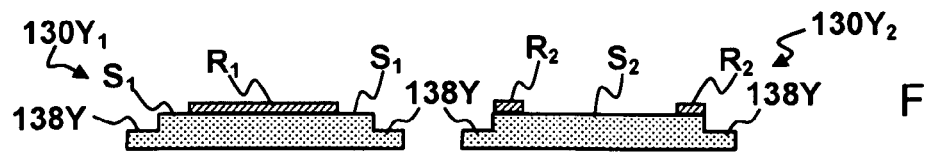
Figure 9Q

OPTICAL APPARATUS WITH REDUCED EFFECT OF MIRROR EDGE DIFFRACTION

CLAIM OF PRIORITY

This application is a continuation-in-part of and claims the benefit of priority of commonly-assigned co-pending U.S. patent application Ser. No. 11/104,143, the entire contents of which are incorporated herein by reference.

This application is a continuation-in-part of and claims the benefit of priority of commonly-assigned co-pending U.S. patent application Ser. No. 11/317,450, the entire contents of which are incorporated herein by reference.

This application is a continuation-in-part of and claims the benefit of priority of commonly-assigned co-pending U.S. patent application Ser. No. 11/469,394, the entire contents of which are incorporated herein by reference.

FIELD OF THE INVENTION

Embodiments of the invention are generally related to optical communications systems and more particularly to optical apparatus that use micromirrors for switching and/or attenuation of optical signals.

BACKGROUND

Multi-channel optical signals typically comprise a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed to form a composite multi-channel signal of the optical network. Each spectral channel is capable of carrying separate and independent information. At various locations, or nodes, in the optical network, one or more spectral channels may be dropped from or added to the composite multi-channel optical signal, as by using, for example, a reconfigurable optical add-drop multiplexer (ROADM). Reconfigurable optical add-drop architectures are disclosed in commonly assigned U.S. Pat. Nos. 6,549,699, 6,625,346, 6,661,948, 6,687,431, and 6,760,511, the disclosures of which are incorporated by reference herein.

An optical switching node may comprise one or more wavelength selective switches (WSS) configured as ADD and/or DROP modules. The referenced patents disclose wavelength selective switch apparatus and methods comprising an array of fiber coupled collimators that serve as input and output ports for optical signals, a wavelength-separator such as a diffraction grating, a beam-focuser, and an array of channel micromirrors, one micromirror for each spectral channel. In operation, a composite multi-wavelength optical signal (also referred to herein as a "multi-channel optical signal") from an input port is supplied to the wavelength separator. The wavelength separator spatially separates or demultiplexes the free-space multi-wavelength optical signal into an angular spectrum of constituent spectral channels, and the beam-focuser focuses the spectral channels onto corresponding ones of the channel micromirrors. The channel micromirrors are positioned such that each channel micromirror receives an assigned one of the separated spectral channel beams. The micromirrors are individually controllable and continuously pivotal (or rotatable) so as to reflect the spectral channel beams into selected output ports. This enables each channel micromirror to direct its corresponding spectral channel into any possible output port and thereby switch the spectral channel to any desired output port. Each output port may receive none, one, or more than one of the reflected and so directed spectral channels. Spectral channels may be selectively dropped from a multi-channel signal by switching the channels to different output ports, and new input channels may be selectively added or combined with the original channels to form different multi-wavelength composite signals.

It is also desirable, for a number of reasons, to be able to monitor and control the power in individual spectral channels of the multi-wavelength optical signal. This includes the ability to completely block the power contained in a particular spectral channel. One reason for controlling the power in a channel is to enable "hitless" switching to minimize undesired crosstalk during repositioning of a channel micromirror to direct ("switch") an input spectral channel beam to a desired output port. During repositioning, the channel micromirror redirects the input spectral channel beam across, i.e., "hits", intermediate ports, which couples unwanted light into the intermediate ports, and causes crosstalk. Thus, it is desirable either to completely block or to substantially attenuate the power in the beam during switching so that unwanted light coupling is avoided. Another use of monitoring and controlling the optical power of a channel is to cause attenuation of that channel to some predetermined level.

The above-mentioned U.S. patents disclose one approach to power management and hitless switching that employs a spatial light modulator, such as a liquid crystal pixel array, to attenuate or completely blocking the power contained in the spectral channels. Each pixel in the liquid crystal array is associated with one of the spectral channels, and a separate focal plane is created at the location of the liquid crystal array such that a spectral spot corresponding to each channel is located on its associated pixel. Since the voltage applied to the pixel controls the light transmissivity of a pixel, the pixel can be made less transmissive or even opaque to the transmission of light by applying an appropriate voltage, thereby attenuating or completely blocking the power in the spectral channel passing through that pixel. However, this approach has the disadvantage of requiring additional components, including a relay lens system to create a focal plane at the liquid crystal array, the liquid crystal array itself, and electronics to control the liquid crystal array. In addition to the added costs for such additional components, more physical space is needed to accommodate these components, which increases the overall size and complexity of the system.

U.S. Pat. No. 6,549,699 discloses another approach to power management of spectral channels in which the rotation of a channel micromirror about its switching axis (the axis of the parallel to the array of channel micromirrors) is controlled to vary the spatial location of the reflected spectral channel beam relative to its intended output port. Since the amount of power in a spectral channel that is coupled to an output port is a function of the coupling efficiency, a desired power level can be obtained by pivoting the channel micromirror a predetermined angle to decouple the optical beam relative to the output port to attenuate it by an amount corresponding to the desired output power level.

A disadvantage of this latter approach is that decoupling the spectral channel beam spatially repositions the beam along the switching axis. Depending upon the physical spacing of adjacent output ports, a portion of the beam may be cross-coupled into an adjacent output port, causing detrimental cross-talk between the ports. Increasing the physical spacing of the ports to decrease the cross-coupling undesirably increases the physical size of the device. Furthermore, as will be described in detail later, using this approach it is difficult to accurately control the power output levels of spectral channels due to the sensitivity of the coupling to rotation of the channel mirror about the switching axis. To overcome this, wavelength selective switches have been developed that utilize rotation of a channel micromirror about a separate axis (herein referred to as the attenuation axis) to vary the power of a selected beam. However, this approach can lead to a non-uniform attenuation of the passband in the form of side lobes herein referred to as side lobe height. It would be desirable to have a wavelength selective switch that is able to achieve accurate attenuation of separate channels without these passband non-uniformities.

It is to these ends that embodiments of the present invention are directed.

SUMMARY OF THE INVENTION

Embodiments of the invention find application, e.g., to optimizing a passband in optical switches that switch components of multi-channel optical signals characterized by spectral channels of different wavelengths between input and output ports. The optical signals may be converted from one or more input ports into spectral beams having a predetermined elongated beam profile by anamorphically expanding the beams in orthogonal directions. The spectral beams are spatially separated into constituent spectral channels. The separated spectral channels may be focused onto corresponding channel micromirrors that switch the focused spectral channels to one or more selected output ports. Each micromirror is positioned to receive one of the spectral channels. Each micromirror is rotatable about a switching axis to switch the spectral channel to a selected output port. Each micromirror is also rotatable about an attenuation axis to vary the coupling of the switched spectral channel to the selected output port to control a power level of the spectral channel output at such selected port.

The effects of diffraction and interference of a spectral beam from the edges of the micromirrors are reduced in order to optimize the passband and reduce the increased power levels between the passbands. This increased power level can cause undesirable effects from the behavior of broadband amplifiers. The undesirable effects of diffraction on the passband may be reduced by appropriate modification of the edges of the micromirrors.

Other more specific aspects of the invention will be set out in the description and claims that follow.

BRIEF DESCRIPTION OF THE DRAWINGS

FIG. 9C is a three-dimensional schematic diagram illustrating an optical apparatus having adjacent step-edged mirrors according to an embodiment of the present invention.

FIG. 9D is a cross-sectional diagram taken along line M-M of FIG. 8L.

FIGS. 9E-9F are graphs of a computer simulation illustrating the effect of stepped micromirror edges on the in an optical apparatus according to an embodiment of the present invention.

FIG. 9N is a plan view schematic diagram of an optical apparatus having micromirrors with patterns of raised features according to an embodiment of the present invention.

FIG. 9O is a cross-sectional diagram taken along line X-X of FIG. 8W.

FIG. 9P is a plan view schematic diagram of an optical apparatus having micromirrors with a patterns of raised features and stepped edges according to an embodiment of the present invention.

FIG. 9Q is a cross-sectional diagram taken along line Z-Z of FIG. 8W.

INTRODUCTION

The output of a wavelength selective switch that uses discrete mirrors to reflect and direct individual channels to different output ports produces a transmission function known as the passband for each channel. In general, the passband is the convolution of the wavelengths spot size and mirror size for that channel. Since the mirror is of finite dimensions, and the light spot size has a finite width, the passband or transmission diminishes as the light spot nears the edge of the channel micromirror. In such a system, when the channel micromirrors are rotated about an axis perpendicular to the wavelength dispersion direction, the out-coupled light is attenuated. The diffraction of light at the edge of the passband produces some diffracted light or angular frequencies that are directed to and thus more efficiently coupled into the output port whereas reflected light in the center of the passband is relatively more attenuated. The diffracted wavelengths coupling are enhanced relative to the reflected wavelengths creating a wavelength dependent loss across the passband. In particular, due to these effects there is less loss at the edges of the passband giving rise to side lobes. Additional constructive and destructive interference effects arise from the diffraction of adjacent mirror edges. The interaction of adjacent mirror diffraction can lead to a substantial increase in the side lobe height due to the coherent addition of the diffracted light from the adjacent mirrors.

Changing the edge of the mirror, by making some sort of pattern on the edge and or by creating a surface relief can alter the direction, phase, and amplitude of the angular frequencies induced by diffraction and thus reduces the side lobe height (SLH).

In view of the above, the side lobes of the passband may be reduced by modification of the edge and or surface profile of the channel mirror.

DESCRIPTION OF PREFERRED EMBODIMENTS

Embodiments of the present invention are particularly applicable to wavelength selective switches (WSS) as used, for example, in reconfigurable optical add-drop multiplexers (ROADM's) permitting dynamic network reconfiguration and enabling management of the power or attenuation of individual spectral channels of a multi-wavelength (multi-channel) optical signal, such that signals can be readily added to or dropped from the network. One or more components of such switches are configured to reduce passband non-uniformities due to diffraction at edges of micromirrors used to switch optical signals from one port to another. It will become apparent, however, that this is illustrative of only one utility of the invention.

Figure 1:
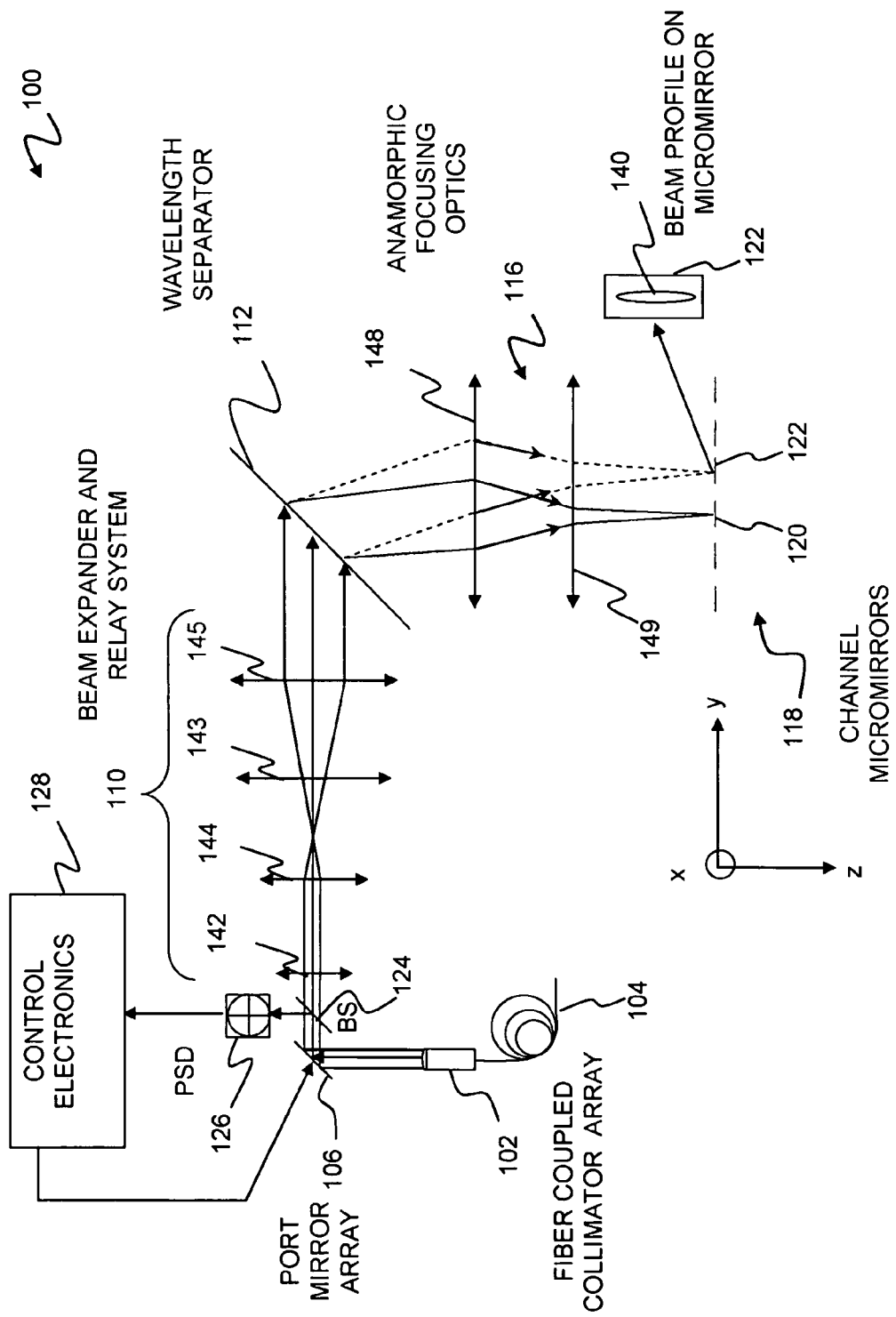
FIG. 1 is a diagrammatic view illustrating an architecture of a wavelength selective switch (WSS) in accordance with an embodiment of the invention, which may be employed in an ADD or DROP module of a ROADM.

FIG. 1 is a diagrammatic view that illustrates an example of an architecture of a portion of a wavelength selective switch 100 of a type that may be used in conjunction with embodiments of the present invention. One or more wavelength selective switches having an architecture as shown in the figure and configured as ADD or DROP modules, may be combined in a ROADM at a node of a wavelength division multiplexed (WDM) optical network, for example. As shown, WSS 100 may comprise a fiber collimator array 102 which provides a plurality of input and output ports for optical signals that are input to and output from the WSS by a plurality of optical fibers 104. Fiber collimator array 102 may comprise a plurality of individual fiber coupled collimators; one connected to each optical fiber and will be described in more detail, for example, in connection with FIGS. 10A, 10B, 10C, 11 and 12. WSS 100 may comprise an optional port mirror array 106 (comprising an array of MEMS micromirrors), an optical beam expander and relay system 110, a wavelength separator 112 which is preferably a diffraction grating, beam focusing optics 116 and an array of channel micromirrors 118, optically arranged as illustrated in FIG. 1.

By way of example and without limiting the scope of the invention, the wavelength separator 112 may be of any of several types of free-space beam separators are commercially available. Preferably, the wavelength separator 112 is a diffraction grating although embodiments of the invention are not limited to such gratings. Suitable types of diffraction gratings include but are not limited to reflection, such as high spatial frequency gratings holographically formed, low spatial frequency gratings such as an Echelle grating, which is a ruled grating, and transmission gratings which can be holographically formed in various polymers.

A composite multi-wavelength optical signal comprising a plurality of spectral channels may be supplied to an input port of the fiber collimator array 102. The beam expander and relay system 110 may be an anamorphic system, e.g., lenses that provide different magnifications along orthogonal axes. The diffraction grating 112 angularly separates the constituent spectral channels of the multi-wavelength optical signal, and the telecentric focusing optics 116, which in this example is also an anamorphic system, focuses the individual spectral channels into spectral spots onto corresponding ones of the channel micromirrors of array 118. Two such channels having center wavelengths $\lambda_i$ and $\lambda_j$ are shown in the figure being focused onto corresponding channel micromirrors 120, 122, respectively. The channel micromirrors are arranged spatially in the array in accordance with the spatial separation of the spectral channels of the composite multi-wavelength optical signal induced by the diffraction grating and the focusing optics such that each channel micromirror receives one of the spectral channels. Spectral channels are reflected from the micromirrors back through the optical system to the fiber collimator array. The channel micromirrors are individually controllable, as will be described, such that upon reflection a spectral channel may be directed, i.e., switched, into a desired output port of the fiber collimator array with a desired coupling efficiency or attenuation.

Each output port may receive and output any number of the reflected spectral channels. Accordingly, spectral channels may be selectively dropped from the composite multi-channel signal by switching the channels to one or more "drop" output ports, and the multi-channel signal containing the remaining channels may be output from a "pass-through" port. Moreover, new input channels may be selectively added or combined at an output port with a subset of the original spectral channels to form a different multi-channel composite signal. Both WSS DROP modules that drop channels from and WSS ADD modules that insert or add channels to the multi-channel optical signal may employ a similar architecture to that shown in FIG. 1, as will be described.

Generally, there may be a separate channel micromirror in array 118 for each spectral channel. A typical multi-channel WDM optical signal may have a number of spectral channels between 4 to 100. The channel micromirrors preferably comprise silicon micro machined mirrors (MEMS mirrors), and each micromirror is preferably a biaxial device, which is capable of independent continuous rotational movement about two orthogonal axes. As will be explained in more detail shortly, this enables a channel micromirror to be pivoted about a first axis to reflect a corresponding spectral channel to a selected output port, and pivoted about the orthogonal axis to control the amount of power coupled to that output port.

Figure 2:
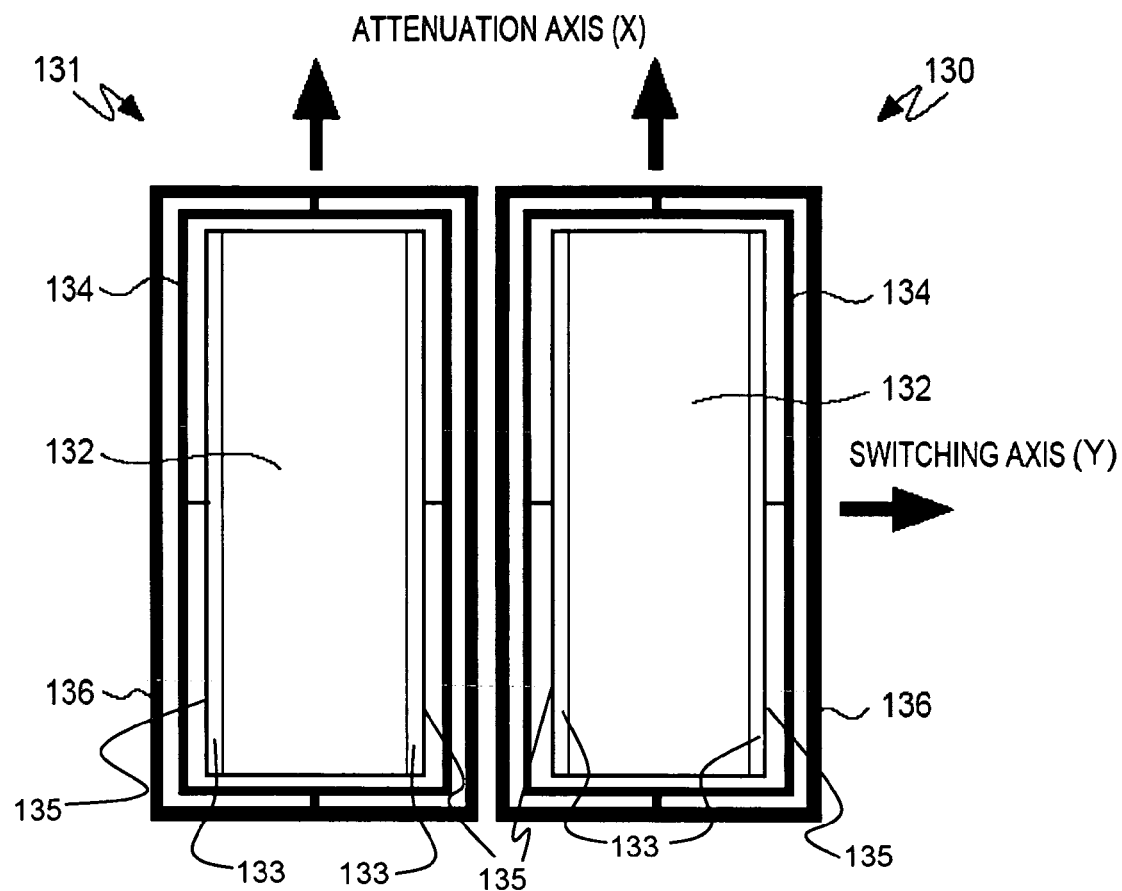
FIG. 2 illustrates a pair of adjacent biaxial channel micromirrors of a micromirror array that may be employed in the wavelength selective switch of FIG. 1.

FIG. 2 illustrates one construction of a biaxial channel micromirror, only for illustration purposes. The present invention regarding to the reduction of side lobe height applies to the top reflection surface of micromirrors and is nearly independent of how the mirrors are actuated. The discussion of the actuation of the micromirrors below is only for the explanation of how channel mirrors work. The figure shows only a pair of adjacent biaxial MEMS channel micromirrors 130, 131 of the plurality of micromirrors of array 118. As suggested by the figure, the remaining micromirrors of the array extend horizontally (in the figure) along the switching axis X with the desired lateral spacing between micromirrors. All micromirrors of the array may have the same construction. Each channel micromirror may compromise an assembly of a planar reflective surface 132 pivotally supported on an inner gimbaled frame 134 for rotation about a horizontal (in FIG. 2) "switching" axis Y. Gimbaled frame 134 may be pivotally supported on an outer frame 136 for rotation about an orthogonal "attenuation" axis X. The pivoting movement of the reflective mirror surface 132 about the orthogonal axes may be continuously variable and actuated electrostatically by applying voltages to opposing pairs of control electrodes (not shown) in a well known manner. There are multiple actuator designs for the biaxial mirrors on which the present invention could apply.

Each channel micromirror has one or more edge regions 133 that are substantially parallel to the attenuation axis X. By substantially parallel it is meant that the edge region 133 is oriented on average more or less parallel to the attenuation axis X. On a local level, however, the boundary or terminus 135 of the edge need not necessarily be always oriented parallel to the attenuation axis. As will become clear in subsequent discussions, diffraction of light at the edge regions 133 can have dramatic effects on the attenuation of light as a function of its wavelength.

As shown in FIG. 2, the reflective mirror surface 132 of the channel micromirrors may have an elongated, preferably rectangular, shape and be oriented with their narrow dimension, e.g., width, along the horizontal switching axis Y, and with their long dimension, e.g., length, along the vertical attenuation axis X. There are a number of reasons for this particular micromirror profile and orientation relative to the orthogonal axes. Referring back to FIG. 1, the switching axis Y of the channel micromirrors of array 118 is parallel to the horizontal plane of FIG. 1, while the attenuation axis X extends into the plane of the figure. This is also indicated schematically in FIG. 1 by the illustration of the beam profile 140 on micromirror 122. It is desirable that the profile of the spectral channel beams being focused onto the micromirrors also be elongated and oriented to conform generally to the shape and size of the micromirror, which can be accomplished via the anamorphic beam expander and relay system 110. Preferably, the beams have a generally elliptical shape, as shown. Moreover, it is desirable to control the spot size and location of a channel beam focused upon a corresponding micromirror relative to the micromirror size to minimize unwanted power loss and to maximize the passband.

Figure 3A:
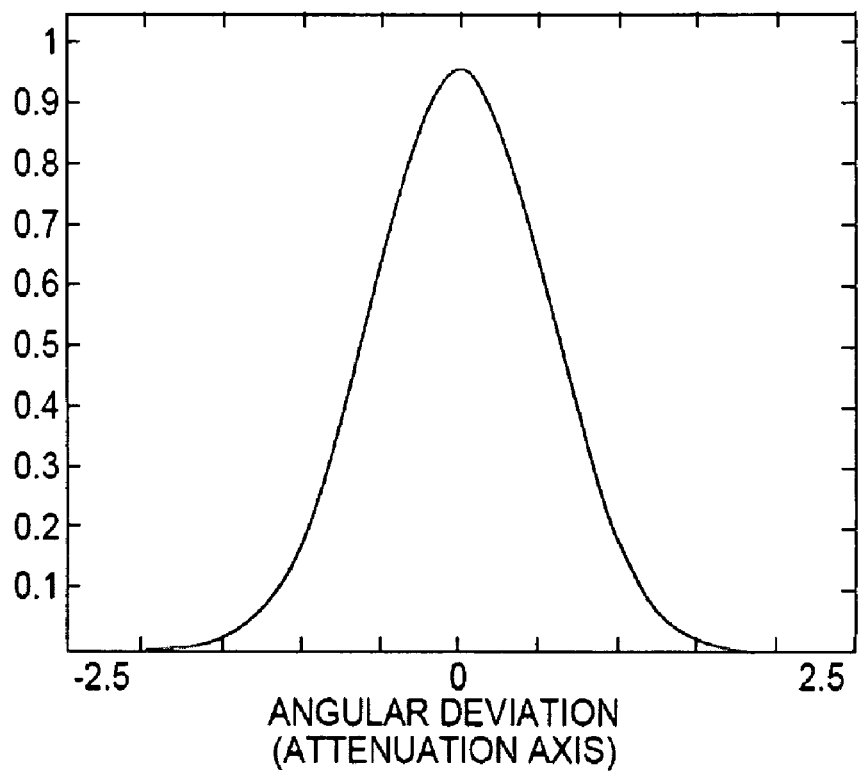
FIGS. 3A-3B are representative curves showing differences in coupling efficiency as a function of rotation about orthogonal attenuation and switching axes of the biaxial channel micromirrors of FIG. 2.

Rotating a channel micromirror along its attenuation axis reduces coupling efficiency for the corresponding spectral channel and causes the amount of light coupled into the output port to be reduced. As the amount of rotation of the channel micromirror about the attenuation axis increases, the coupling continuously decreases until light is no longer coupled to the output port. FIG. 3A is a curve that is representative of the variation in coupling as a function of the angle of rotation of a channel micromirror about its attenuation axis X. As the channel micromirror rotates either positively or negatively from an angle of zero degrees, corresponding to a maximum coupling condition, the coupling rapidly decreases so that at an angle of approximately plus or minus 2.5 degrees in this example, substantially no light is coupled into the output fiber. The sensitivity of the angle depends on the dimension of the optical beam profile. The larger beam width, the smaller angle is required to attenuate the coupling of the light.

Figure 3B:
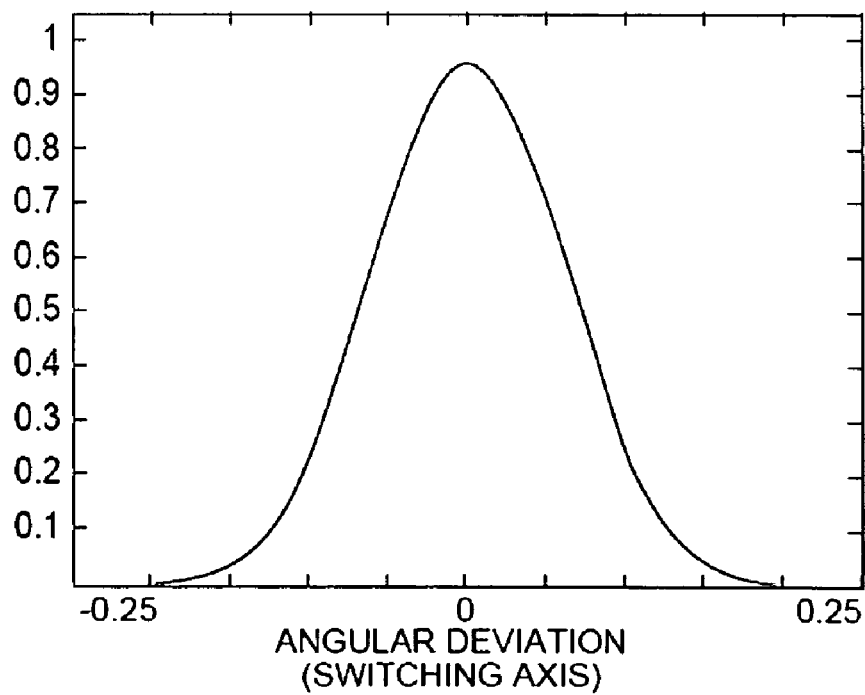

FIG. 3B is a similar representative coupling curve for rotation of the channel micromirror about its switching axis Y. As shown, for the particular micromirror design illustrated in the two curves, the coupling efficiency as a function of angular rotation of the channel micromirror about its switching axis is approximately ten times more sensitive than the coupling efficiency for rotation of the channel mirror about its attenuation axis. The difference of angle sensitivity originates from the elliptical beam shape on the mirror surface. For a MEMS channel micromirror having reasonable size and mechanical characteristics and for an optical system designed to afford optimum optical performance in the wavelength range of interest, e.g., 1550 nm, the coupling efficiency for rotation of a channel micromirror about the switching axis Y may be as shown in the curve of FIG. 3B. However, the high sensitivity of coupling efficiency to angular rotation about the switching axis Y for this micromirror, as shown in the curve of FIG. 3B, makes it difficult to accurately and stably control power level using this axis, particularly under adverse environmental conditions such as shock, vibration, temperature variations and aging of components. Rather, desensitizing the coupling efficiency to that shown in FIG. 3A for the attenuation axis X permits more stable and accurate control of power level over the range of normal operating conditions. For an elongated mirror profile such as shown in FIG. 2, the coupling efficiency of light reflected from the channel micromirrors is determined principally by the anamorphic beam expander and relay system 110 (WSS) of FIG. 1.

Figure 4:
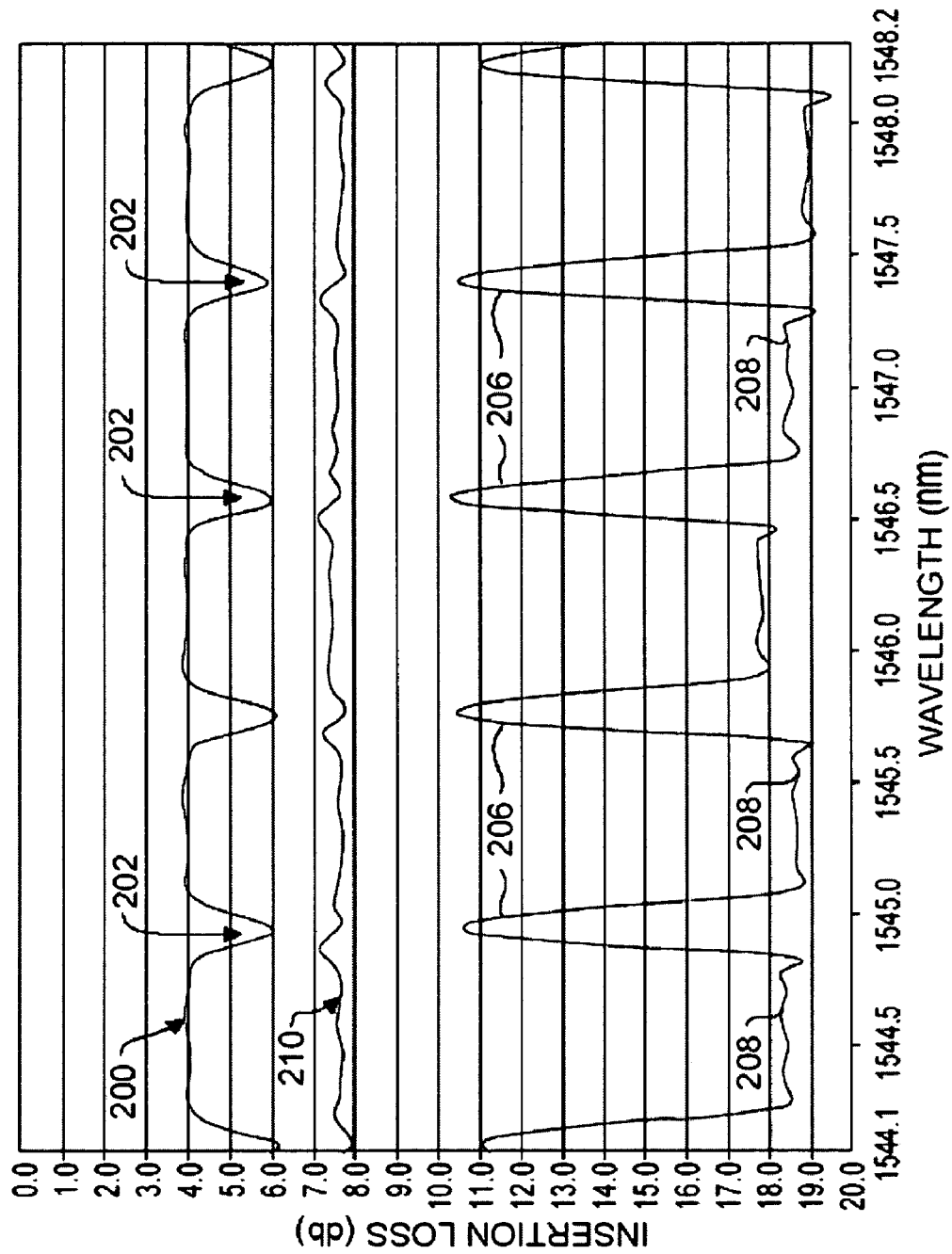
FIG. 4 shows plots of power level (represented as insertion loss) as a function of wavelength over the wavelength region of several adjacent channel micromirrors

As discussed above, diffraction of light at the micromirror edge can introduce anomalies in the attenuation of optical signals as a function of their wavelengths. FIG. 4 illustrates on the same plot three different curves that represent the power reflected from adjacent channel micromirrors over a wavelength region in the 1550 nm wavelength band corresponding to five adjacent spectral channels for different levels of attenuation (insertion loss). The curves may be generated using a broad-band light source, for instance. The top curve 200 represents the reflected power from the five channel micromirrors for optimal coupling. As shown, the reflected power is substantially constant at a level corresponding to approximately 4.0 dB insertion loss over a relatively wide wavelength region of each channel micromirror. (The 4.0 dB loss is due to the overall system optical loss.) This is referred to as the passband region. Curve 200 also shows a region 202 between each channel micromirror corresponding approximately to the lateral spacing between adjacent micromirrors where there is a reduction in reflected power level. This is further illustrated by curve 204, which shows that by attenuating the power level by a relatively large amount (approximately 14 dB in the figure). The power represented by the peaks 206 is due to diffraction from the edges of the micromirrors. The power level in the passband region 208 between the peaks is at approximately 18.0 dB. The peaks 206 represent an increase in signal intensity of a spectral channel near side edges of a passband for a spectral channel reflected from a micromirror relative to the central passband region 208. The peaks 206 are believed to be due to diffraction of the spectral channel from the edge of the micromirror when the spectral channel is attenuated by rotating the micromirror about its attenuation axis.

As set forth above, the peaks 206 (sometimes referred to as the side lobe height (SLH)) can present problems when optical signals switched by the wavelength selective switch 100 are transmitted over an optical communications network. Specifically, optical communication networks often utilize optical amplifiers to compensate for signal losses encountered as optical signals pass through various components of the network. Such optical amplifiers are often broadband in nature, i.e., they amplify optical signals over a broad band of wavelengths more or less indiscriminately. Due to the SLH effect as exhibited by the peaks 206, noise near the edges of the pass band can be amplified to a much greater extent than signal from the central portion of the passband. Such high signal intensity can damage components of the network and degrade the signal-to-noise ratio throughout the network. The problem is exacerbated when wavelength selective switches are cascaded.

The SLH effect is less pronounced when the power level is attenuated by a relatively small amount. For example, the middle curve 210 in FIG. 4.

The edge diffraction effect and interference of diffraction from adjacent mirror edge diffraction can be reduced in a number of different ways. For example, according to certain embodiments of the present invention, attenuation may be effected by a combination of rotation about the attenuation axis and rotation about the switching axis of either or both the channel mirror array. Since rotation about the switching axis strongly attenuates the beam and is relatively insensitive to edge diffraction, the two rotations can be combined in a way that reduces or even eliminates the detrimental effects of edge diffraction and the associated SLH phenomena.

Figure 5:
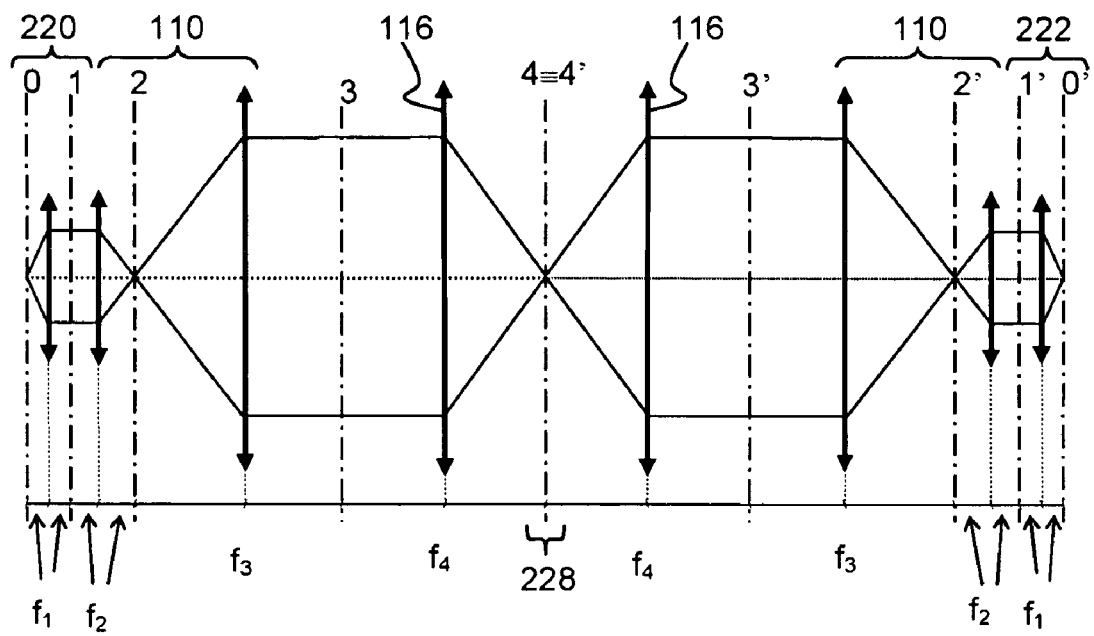
FIG. 5 is a schematic diagram of an optical switching apparatus.

To illustrate the nature of the SLH phenomenon, FIG. 5 depicts a paraxial model of a WSS 220 of the type shown in FIG. 1. In the WSS 220 light from a fiber coupled to an input port 224 at the point labeled 0 is collimated by a lens of focal length $f_1$ at the input port 224 (indicated as region 1). The collimated beam, is then expanded by an anamorphic beam expander system 110 having lenses of focal lengths $f_2$ and $f_3$ with a common focal point indicated at 2. The beam is diffracted by a grating 112 at point 3 and a particular channel is focused by an anamorphic focusing lens system 116 onto a channel micromirror 228 at point 4≡4'. The micromirror 228 reflects the channel back through the focusing system 116, which couples the channel to the diffraction grating 112 at 3'. The channel is coupled from the grating 112 to the beam expander and relay system 110 (through points 2' and 1') which couples the channel to an output port 222 indicated at 0'.

If cylindrical optics are use in the system, the focal lengths $f_n$ (n=1, 2, 3, 4) may be different depending on whether the tangential or the sagittal plane is considered. Using a Fresnel approximation it can be shown that the optical field impinging on the channel mirror is the scaled image of the field at the input fiber, $V_o(x,y)$, showing below:

$$V_4(x, y) = \exp(i\phi) \frac{1}{\sqrt{K_x K_y}} V_0(x/K_x, y/K_y) \qquad \text{Eq. (1)}$$

The field exiting the channel mirror may be obtained by multiplying $V_4$ times the transfer function $T_{cm}$ of the mirror:

$$V_{4'}(x,y) = T_{cm}(x,y) V_4(x,y) \qquad \text{Eq. (2)}$$

Using the Fresnel paraxial approximation the field at the output fiber may be given by:

$$V_{0'}(x,y) = \sqrt{K_x K_y} V_{4'}(xK_x, yK_y) = T_{cm}(xK_x, yK_y) V_0(x,y) \qquad \text{Eq. (3)}$$

In the preceding equation a phase term due to the propagation through the system has been neglected.

The system insertion loss IL is given by performing an overlap integral:

$$IL = |\int V_0(x,y) T_{cm}*(xK_x, yK_y) V_0*(x,y) dx dy|^2 \qquad \text{Eq. (4)}$$

Figure 6:
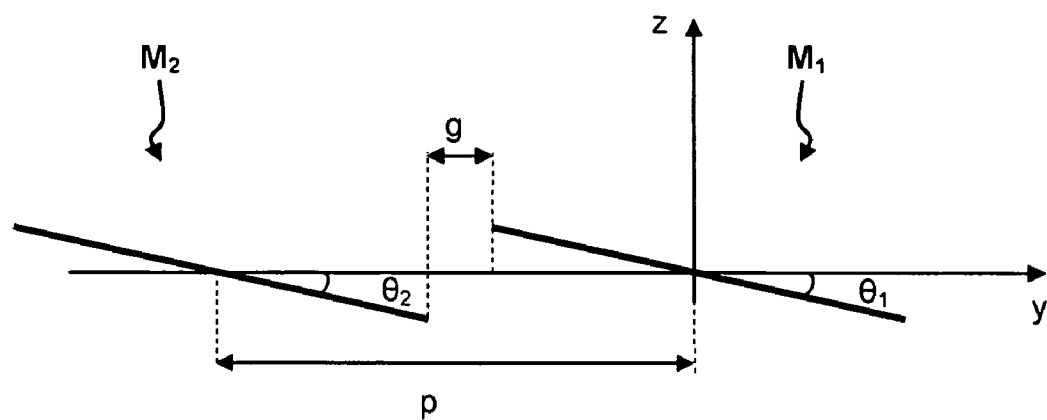
FIG. 6 is a schematic diagram of an optical switching apparatus having adjacent channel micromirrors.

$V_0$ is the fiber mode, which can be approximated quite accurately by a Gaussian profile. Thus, to be able to compute the insertion loss IL, one only need to model the transfer function of the channel mirror $T_{cm}$. To derive the transfer function of the channel mirror it is sufficient to consider only two adjacent mirrors $M_1$, $M_2$, as illustrated in FIG. 6.

Assuming a optical wave traveling along negative z direction, the reflected field will be given (at z=0) by:

$$\begin{cases} -\exp[-iky\sin(2\theta_1)] & x \geq -(p-g)/2 \\ 0 & -(p+g)/2 < x < -(p-g)/2 \\ -\exp[-ik(y+p)\sin(2\theta_2)] & x \leq -(p+g)/2 \end{cases} \qquad \text{Eq. (5)}$$

In the paraxial approximation the grating dispersion results in a shift of the beam position on the channel mirror array. The same effect may be obtained by keeping the beam position fixed and shifting the mirrors along the Y (the dispersion direction). Thus the grating dispersion may be included in the model by using the transfer function modified as $$T_{cm}(x, y-s(\lambda)) \qquad \text{Eq. (6)}$$

where the shift $s(\lambda)$ is caused by the dispersion of the grating 112.

Using this model the two mirrors may be rotated independently, thus simulating their mutual interaction. The graph in FIG. 7 shows the computed passband when the first mirror $M_1$ is tilted by $\theta_1 \cong 1.5°$ (15 dB attenuation) and the tilt angle of the second mirror $M_2$ varies from $\theta_1 - 0.15° < \theta_2 < \theta_1 + 0.15°$.

Figure 7:
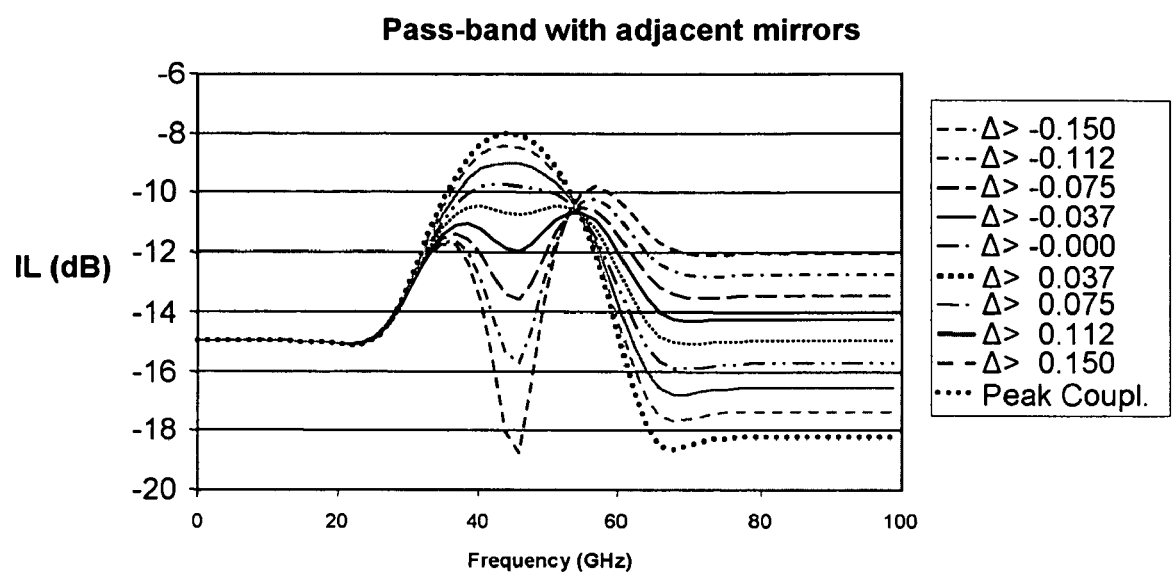
FIG. 7 is a graph of a computer simulation illustrating the effect of rotation of one channel micromirror on the passband for an adjacent channel micromirror.

The plot shown in FIG. 7 was obtained using p=100 μm, and g=7 μm. Other plots with different SLH can be obtained by changing these parameters and/or $\theta_1$ and $\theta_2$. Small variations of these parameters may considerably affect the side lobe height. The result shown in FIG. 7 confirms that the above-described model may be used to predict the side lobes. The model is also able to predict the side lobes due to the mutual interference of adjacent mirrors. The model shows that side lobe height changes as the mirror parameters (e.g. p, g, θ) are changed.

According to embodiments of the present invention, the effect of diffraction may be reduced by appropriately modifying the edge region 133 of the micromirrors 130 used in the micromirror channel array 118. Two general approaches can be taken, one by varying reflectivity of the area near the edge and one by varying the reflection phase on top of the general description of the mirror transfer function depicted in Eq. (5).

Figure 8A:
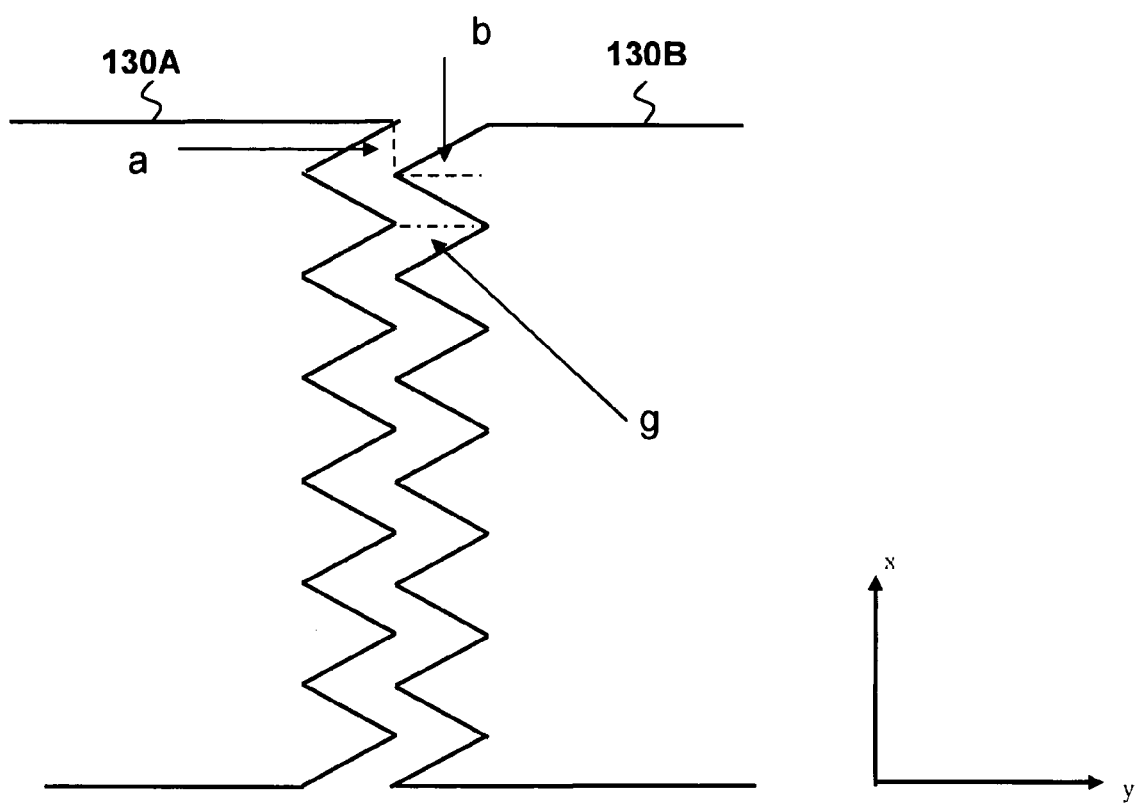
FIG. 8A is a schematic diagram of micromirrors having sawtooth edges configured to reduce the effect of edge scattering according to an embodiment of the present invention.

FIG. 8A depicts a top view of an example of a micromirror having sawtooth edge 133A according to one embodiment of the invention. A sawtooth edge is but one example of an edge shape that deviates from a straight line in a way that reduces the SLH due to diffraction of a spectral channel from the edge when the spectral channel is attenuated by rotating the micromirror about its attenuation axis. In this example, two adjacent sawtooth mirrors 130A, 130B are characterized by a pitch=2a, where a is the distance along the x axis between a tooth on one mirror and an adjacent tooth on the other. The saw teeth on the mirrors 130A, 130B are further characterized by a depth b and a gap g. The rationale of using a saw-tooth mirror is to provide a smoother transition by gradually reducing the mirror reflective area. The transfer function will now depend on both x and y coordinates.

To illustrate the effectiveness of the sawtooth configuration in reducing the side lobe height consider a case where b=15 μm, a=4 μm, g=12 μm and p=106.7 μm (i.e. the distance between mirror 130C and 130D of an array of micromirrors). The parameters for achieving best SLH reduction depend on the overall optical design.

Figure 8B:
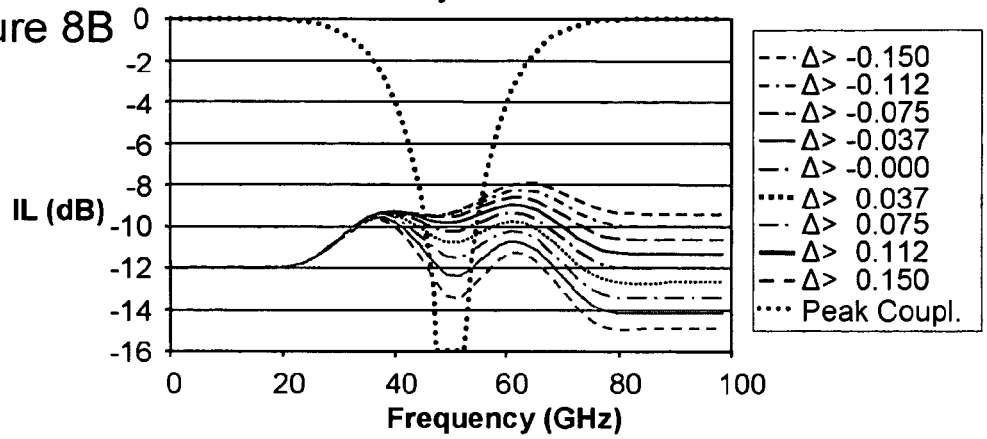
FIGS. 8B-8C are graphs of a computer simulation illustrating the effect of sawtooth micromirror edges on the in an optical apparatus according to an embodiment of the present invention.
Figure 8C:
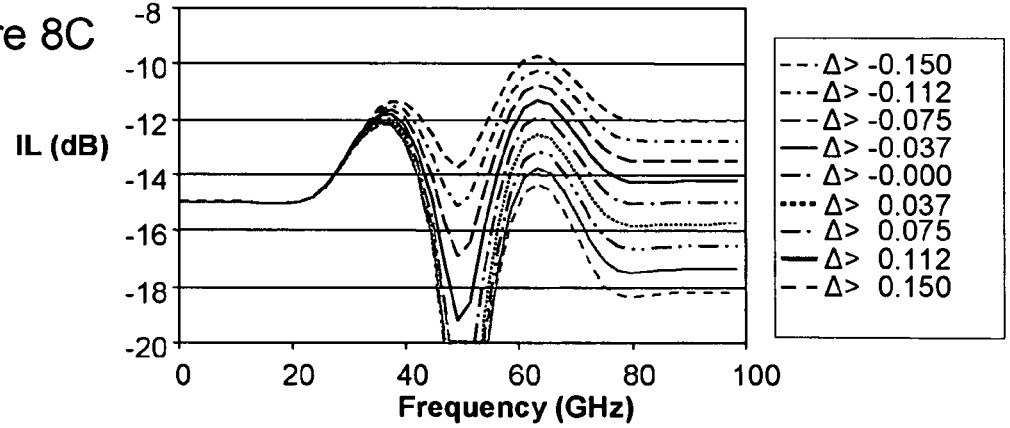

The computations show that there is a reduction (with respect to the straight edge case) of the side lobe height and the mutual interference between adjacent mirrors is also reduced. The side lobe height is about 2.5 dB at 12 dB attenuation as shown in FIG. 8B and 3.5 dB at 15 dB attenuation as shown in FIG. 8C.

Figure 8D:
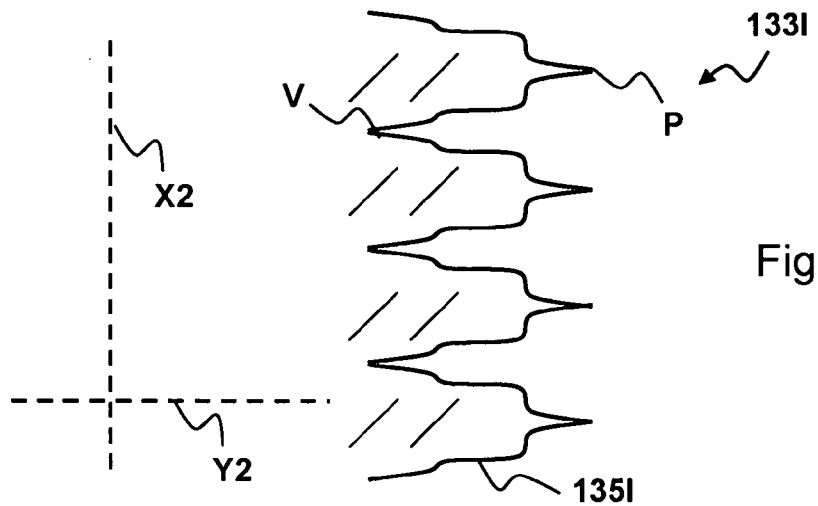
FIG. 8D is a schematic diagram illustrating an alternative micromirror edge that may be used in embodiments of the present invention.

There are many variations on the sawtooth configuration. The shape of the sawtooth indentations and the periodicity of the teeth may all be varied. In addition, the edges do not need to be straight, for example, as shown in FIG. 8D.

Figure 9A:
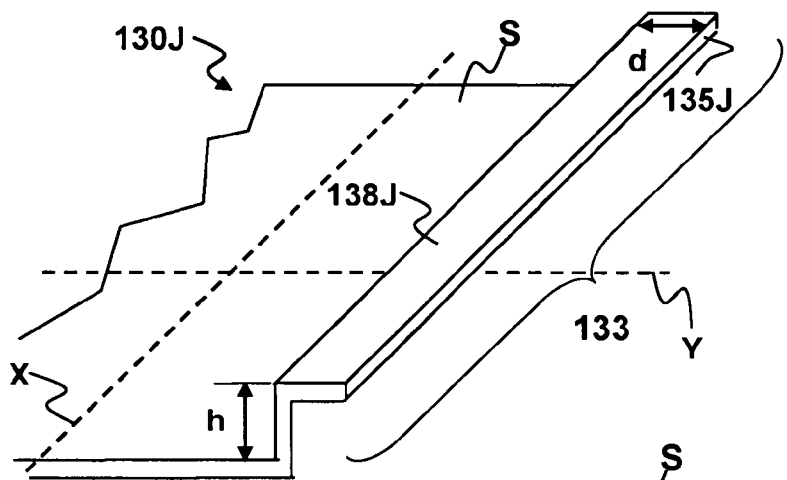
FIGS. 9A-9B are schematic diagrams illustrating portions of micromirrors having stepped edges according to an embodiment of the present invention.

In an alternative embodiment, the edges of the micromirrors that are parallel to the attenuation axis may be characterized by edge features that protrude above a plane of the micromirror surface and/or are submerged below the plane of the micromirror surface. By way of example, as shown in FIG. 9A a micromirror 130J may have an edge 133J with a three-dimensional projection in the form of a step 138J proximate to terminus 135J. The projection 138J may be characterized by a width w from the terminus 135J, and a height h relative to a surface S of the micromirror 130J. The height h may have any effective value. By way of example, and without limitation, the height h may be close to one eighth of a wavelength of light of the spectral channel that is deflected by the micromirror 130J. This particular height is sometimes referred to herein as $\lambda/8$.

Figure 9B:
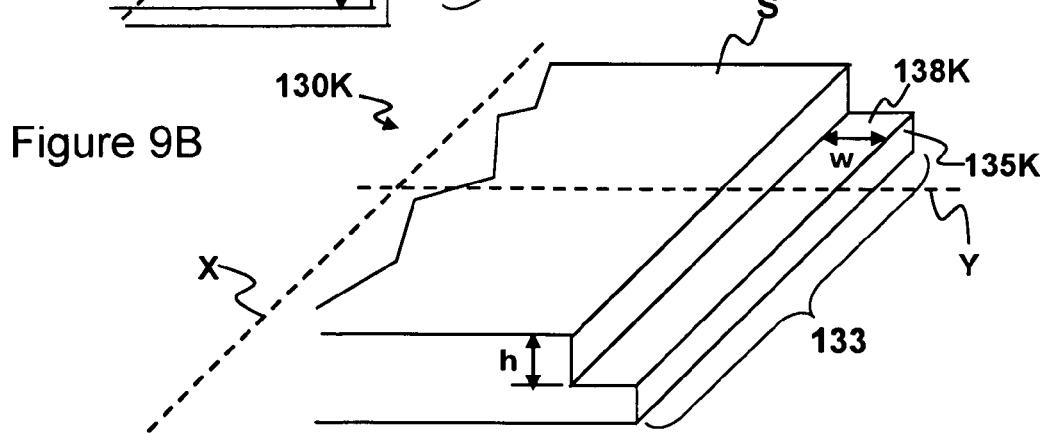

In variation on the preceding embodiment, FIG. 9B depicts a micromirror 130K having an edge 133K with a three-dimensional submerged portion in the form of a submerged step 138K proximate to terminus 135K. The step 138K may be characterized by a width w from the terminus 135K, and a depth h relative to a surface S of the micromirror 130K. The depth h may have any effective value. By way of example, and without limitation, the height h may be one eighth of a wavelength of light of the spectral channel that is deflected by the micromirror 130K.

Furthermore, as shown in FIG. 9C and FIG. 9D, an array of micromirrors may include adjacent micromirrors $M_N$ and $M_{N+1}$ that include both raised steps $138M_1$, $138M_3$ and submerged steps $138M_2$, $138M_4$. along opposite edges that are parallel to the attenuation axes $X_N$ and $X_{N+1}$ for the two mirrors. By way of example the raised steps $138M_1$, $138M_3$ and submerged steps $138M_2$, $138M_4$ may be characterized by step heights h and step widths w. The edges of adjacent steps $138M_2$, $138M_3$ on the mirrors $130M_N$, $130M_{N+1}$ may be separated from each other by a gap g. The spacing between the mirrors $130M_N$, $130M_{N+1}$ may also be characterized by a pitch p, which may be measured, e.g., between the raised step edges $138_1$, $138_3$ of adjacent mirrors $138M_N$, $138M_{N+1}$.

The performance of micromirrors configured as shown in FIGS. 9C-9D may be modeled by including a phase step in the transfer function for the mirrors in Eq (5). Computation with micromirrors configured in this fashion have shown a reduced height of the side lobes in the passband of the spectral channel associated with the micromirrors.

FIG. 9E and FIG. 9F show plots of computed insertion loss (IL) as a function of frequency for different attenuations. For the plots shown in FIGS. 9E-9F, the following assumptions were used.

$h=\lambda_N/8$ ($\lambda_N=1546.12$ nm is the wavelength of the light in the signal channel incident on mirror $130M_N$)

w=2.3 µm g=7 µm p=106.7 µm (e.g. the distance between the raised step edges $138M_1$ and $138M_3$ of mirrors $130M_N$ and $130M_{N+1}$ of the array)

For the plot in FIG. 9E 12 dB attenuation was assumed for mirror $130M_N$ and in FIG. 9F, a 15 dB attenuation was assumed. The angle of rotation for mirror $130M_{N+1}$ about the attenuation axis was varied. Different plots indicate different values of the angular difference $\Delta$ between the attenuation axis rotation angles for the two mirrors. The side lobe height is about 2 dB at 12 dB attenuation and about 3 dB at 15 dB attenuation.

As may be seen from FIGS. 9E-9F, the computations show that there is a reduction (with respect to the straight edge case) of the side lobe height and the mutual interference between adjacent mirrors is also reduced.

Several variations are possible on the apparatus shown in FIGS. 9C-9D. For example, in FIGS. 9C-9D, the raised steps $138M_1$, $138M_3$ are on the left-hand edges of the mirrors and the submerged step edges $138M_2$, $138M_4$ are on the right-hand edges. It is noted that embodiments of the present invention include configurations in which the submerged steps are along the left-hand edges and the raised steps are along the right-hand edges. Furthermore, in FIG. 9C, both the raised step features and the submerged step features are characterized by a constant step width w.

Figure 9G:
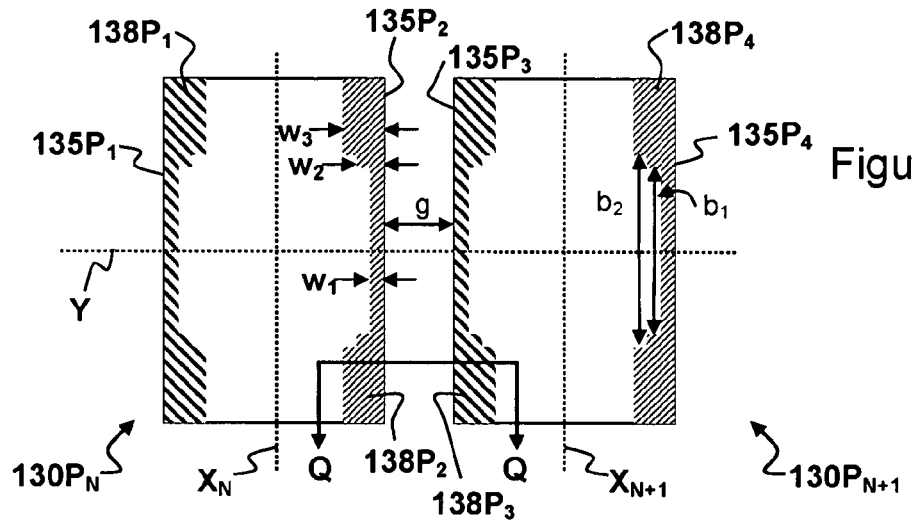
FIG. 9G is a plan view schematic diagram of an optical apparatus having an alternative step-edged configuration according to an embodiment of the present invention.
Figure 9H:
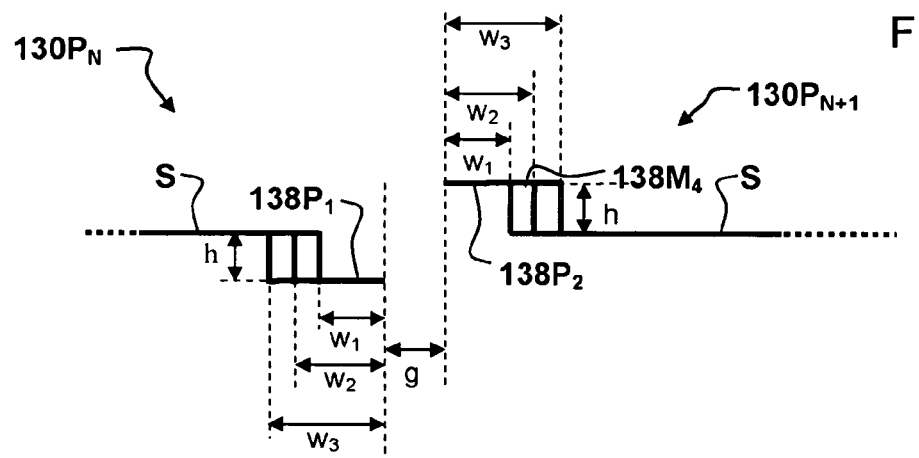
FIG. 9H is a cross-section taken along line Q-Q of FIG. 8P.

In an alternative embodiment, raised and/or submerged edge step features may include regions characterized by regions of different widths. For example, as shown in FIGS. 9G-9H, an optical switching apparatus may include an array of channel micromirrors including adjacent mirrors $130P_N$ and $130P_{N+1}$ configured to rotate about attenuation axes $X_N$ and $X_{N+1}$ respectively and a switching axis Y. Mirrors $130P_N$, $130P_{N+1}$ include raised edge step features $138P_1$, $138P_3$ and submerged edge step features $138P_2$, $138P_4$. Each step feature may be characterized by a step height h and regions of differing width. In this example there are three regions including regions of length L and width $w_1$ proximate the terminations $135P_1$, $135P_2$, $135P_3$ and $135P_4$ of the edges of the mirrors. There may also be a second region of width $w_2>w_1$ and length $b_1$ and a third region of width $w_3>w_2$ and length $b_3$. Adjacent mirrors $130P_N$ and $130P_{N+1}$ may be separated by a gap g between the terminations of adjacent edges $135P_2$ and $135P_3$.

Figure 9I:
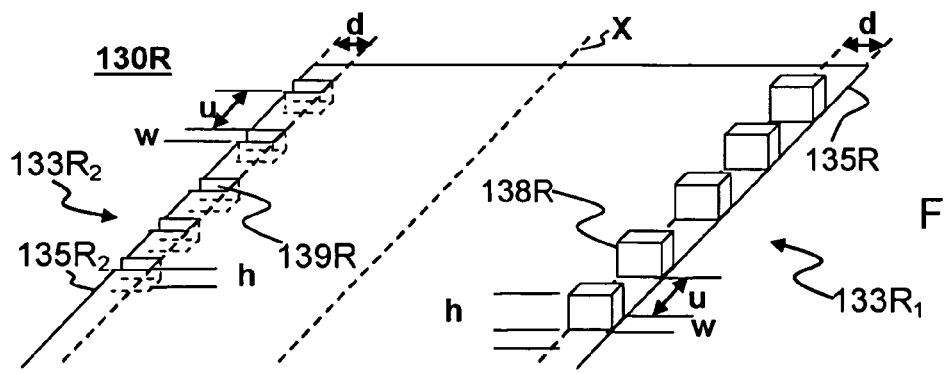
FIG. 9I is a three-dimensional schematic diagram of a micromirror having a plurality of three-dimensional edge features according to an embodiment of the present invention.

In yet another alternative embodiment, the micromirrors may include edge features that protrude above a plane of the micromirror surface and/or are submerged below the plane of the micromirror surface. For example, as depicted in FIG. 9I a micromirror 130R may have an edge $133R_1$ with three-dimensional projections 138R spaced along the edge proximate to terminus $135R_1$. The projections 138R may each be characterized by a horizontal depth d from the terminus $135R_1$, a height h, and a width w (measured along the edge $133R_1$). Adjacent projections may be spaced a distance u apart. The projections 138R may be sized and shaped in such a way as to produce interference between optical wavefronts reflecting from the projections and wavefronts reflecting from the spaces between the projections such that the different light reflections at the edge $133R_1$ tend to cancel each other out. By way of example, the height h may be chosen to be roughly equal to an eighth of a wavelength of the light reflecting from the mirror 130R. Furthermore, the mirror 130R may include three-dimensional projections 139R of depth h applied in the opposite manner to an opposite edge $133R_2$ proximate at terminus $135R_2$ thereof. The projections 139R may be indentations below the surrounding surface rather than projections above it. It is noted that in the limit where u=0 in FIG. 9I, the projections (or indentations) combine to form a continuous strip of height (or depth) h and width d.

Figure 9J:
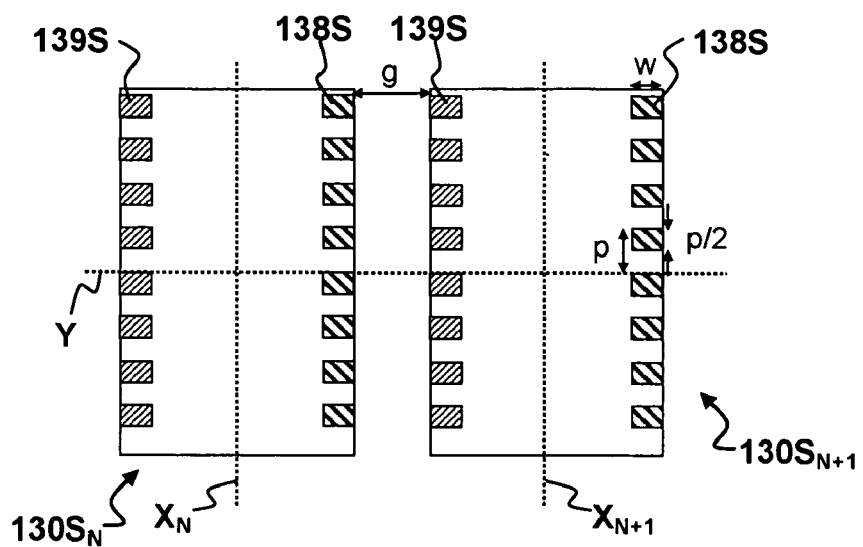
FIGS. 9J-9K are plan view diagrams of optical apparatus having micromirrors with pluralities of three-dimensional edge features.

According to an embodiment of the present invention a wavelength selective switch of the type shown in FIG. 1 may include a micromirror array having adjacent micromirrors configured as shown in FIG. 9J. In particular adjacent edges of adjacent micromirrors $130S_N$, $130S_{N+1}$ are separated by a gap g. The micromirrors $130S_N$, $130S_{N+1}$ are configured to rotate about attenuation axes $X_N$, $X_{N+1}$ respectively and a switching axis Y. One edge of each micromirror includes raised features 138S characterized by a pitch p and a feature length p/2, feature width w, and a height h. An opposite edge of each micromirror includes submberged features 139S characterized by a pitch p, length p/2, width w and depth h.

There are a number of possible variations on the apparatus shown in FIG. 9J. For example, as shown in FIG. 9K, a width w may vary among the raised step features 138T and submerged step features 139T for adjacent micromirrors 130T$_N$ and 130T$_{N+1}$, By way of example, and without loss of generality, the width w of the step features 138T, 139T may vary linearly with respect to distance from the switching axis Y.

Figure 9K:
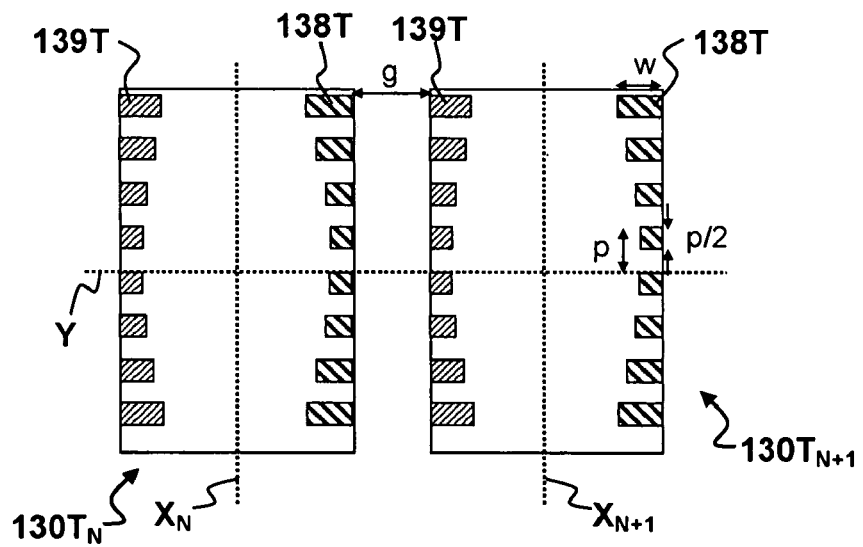
Figure 9L:
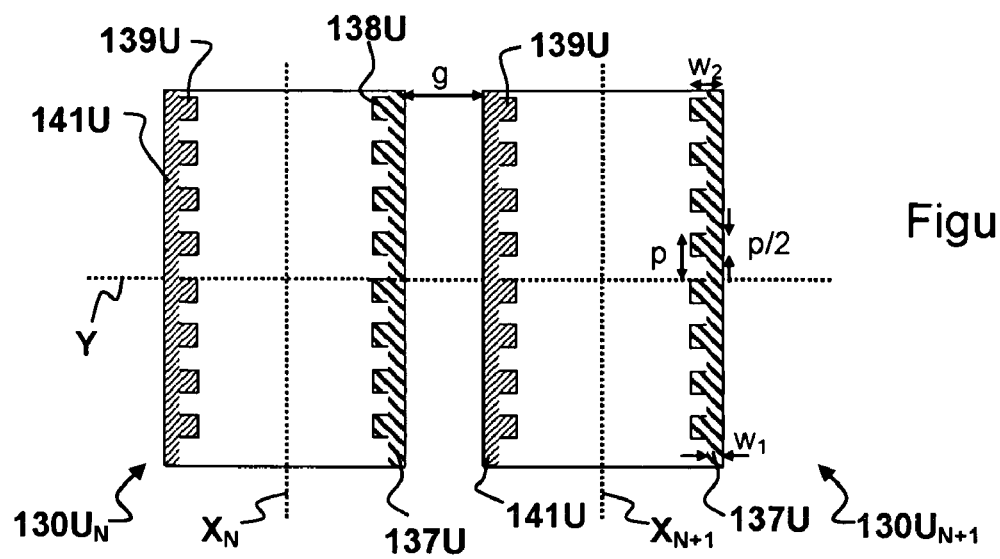
FIGS. 9L-9M are plan view diagrams of optical apparatus having micromirrors with a combinations of edge steps and pluralities of three-dimensional edge features.

Furthermore, step features of the type shown in FIG. 9I may be combined with step features of the type shown in FIG. 9C as shown in FIG. 9L. Specifically, adjacent micromirrors 130U$_N$, 130U$_{N+1}$ may include a raised step 137U of height h and width w$_1$ running along one edge and a plurality of raised features 138U of pitch p, length p/2, width w$_2$ and height h projecting inward (i.e., toward the attenuation axes X$_N$, X$_{N+1}$) from the raised step 138U. Each micromirror may also include a submerged step 141U of depth h running along an opposite edge a plurality of submerged features 139U of pitch p, length p/2, width w$_2$ and depth h projecting inward from the submerged step 141U.

Figure 9M:
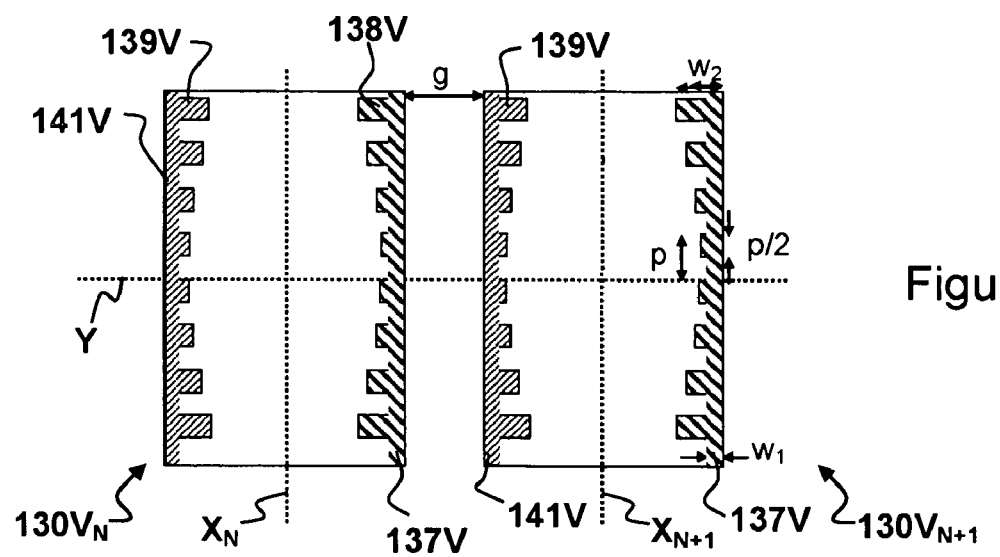

Furthermore the features of FIGS. 9K and 9L may be combined as shown in FIG. 9M. Specifically, adjacent micromirrors 130V$_{N+1}$, 130V$_N$ may include raised and submerged step features 137V, 141V of width w$_1$ and height/depth h running along the edges of the micromirrors combined with inward projecting raised and submerged features 138V, 139V of pitch p, length p/2 width w$_2$ and height/depth h. The widths w$_2$ of the features 138V, 139V may vary in manner similar to the shown in FIG. 9K. By way of example, and without loss of generality, the widths w$_2$ of the features 138V, 139V may vary linearly with respect to distance from the switching axis Y.

The concepts described above may be extended to arbitrarily-shaped patterns of raised and/or submerged portions of the micromirror surface. In some embodiments, the patterns of raised and submerged portions may be inverses of each other for adjacent micromirrors in an array. For example, as shown in the top view of FIG. 9N and the top view of FIG. 9O, adjacent micromirrors 130W$_1$ and 130W$_2$ may have raised and/or submerged portions that are inverses of each other. Specifically, a first micromirror 130W$_1$ may have a raised central portion R$_1$ and non-raised or submerged portions S$_1$ proximate edges that are parallel to an attenuation axis X$_1$. An adjacent second micromirror 130W$_2$ may have an inverse pattern characterized by a submerged central portion S$_2$ and raised portions R$_2$ proximate edges that are parallel to an attenuation axis X$_2$. Note that patterns of raised and submerged portions for the first and second micromirrors are inverses of each other in the sense that the raised portion R$_1$ of the first micromirror 130W$_1$ corresponds in layout to the submerged portion S$_2$ of the second micromirror and the submerged portions S$_1$ of the first micromirror correspond in layout to the raised portions R$_2$ of the second micromirror. By way of example, a height of the raised portions R$_1$, R$_2$ above a surface level of the submerged portions may correspond to $\lambda/8$.

Alternatively, one may regard the submberged portions S$_1$, S$_2$ as being submerged by $\lambda/8$ below a surface level of the raised portions R$_1$, R$_2$.

In a combination of the embodiments shown in FIG. 9C and FIGS. 9N-9O, a step may be combined with a patterned mirror surface. Specifically, as shown in FIGS. 9P-9Q, adjacent mirrors 130Y$_1$ and 130Y$_2$ may have patterns of raised portions R$_1$, R$_2$ and submerged portions S$_1$, S$_2$ that are inverses of each other as in FIGS. 9N-9O. By way of example, a height of the raised portions R$_1$, R$_2$ above a surface level of the submerged portions may correspond to $\lambda/8$. Alternatively, one may regard the submberged portions S$_1$, S$_2$ as being submerged by $\lambda/8$ below a surface level of the raised portions R$_1$, R$_2$. In addition to the pattern, each of the adjacent micromirrors 130Y$_1$, 130MY$_2$ may include submerged steps 138M at edges parallel to their respective attenuation axes X$_1$, X$_2$. By way of example, the steps 138M may be characterized by a depth h of $\lambda/8$ and a width w. Computer simulations with adjacent micromirrors configured in this fashion have shown both reduced side lobes as well as reduced interference between the spectral channels associated with the micromirrors.

While the foregoing description has been with reference to particular embodiments of the invention, it will be appreciated by those skilled in the art that changes may be made in these embodiments without departing from the spirit and principles of the invention, the scope of which is defined in the appended claims. Any feature, whether preferred or not, may be combined with any other feature, whether preferred or not. For example, edge modification as described with respect to FIG. 8A-9C may include both stepped and sawtooth edges. Furthermore, edge modification may be combined with attenuation using a combination of switching axis and attenuation axis rotation.

While the above includes a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A micromirror for use in an optical apparatus, comprising:
   a reflective portion, configured to be rotatable about a switching axis and an attenuation axis, wherein the attenuation axis is different from the switching axis,
   wherein the reflective portion includes an edge that is substantially parallel to the attenuation axis,
   wherein the edge includes one or more edge features that protrude above a plane of the micromirror surface and/or are submerged below the plane of the micromirror surface and/or have an edge shape that deviates from a straight line in a way that reduces an increase in signal intensity of a spectral channel near side edges of a passband for a spectral channel reflected from the micromirror relative to a central portion of the passband due to diffraction of that spectral channel from the edge when the spectral channel is attenuated by rotating the channel micromirror about the attenuation axis.

2. The apparatus of claim 1, wherein the one or more edge features are configured to reduce effects of diffraction of a spectral beam reflected from the edge.

3. The apparatus of claim 2 wherein at least a portion of the edge has a vector component along the switching axis.

4. The apparatus of claim 3 wherein a portion of the edge has a sawtooth configuration.

5. The apparatus of claim 4 wherein the sawtooth configuration is characterized by sawtooth angle of between about 5 degrees and about 85 degrees relative to the attenuation axis.

6. The apparatus of claim 1 wherein the edge features include one or more features that protrude above a plane of the micromirror surface and/or are submerged below the plane of the micromirror surface by a distance approximately equal to one-eighth of a wavelength of light that is likely to strike the mirror.

7. The apparatus of claim 1 wherein each of the features protrudes above (or are submerged below) the plane of the micromirror surface by a distance approximately equal to one-fourth of a wavelength of light that is likely to strike the mirror or an amount that causes destructive optical interference due to the presence of the features and the micromirror surface in such a way so as to eliminate or diminish diffraction from the edge region of the micromirror surface.

8. The apparatus of claim 1 wherein the edge includes a grey scale mask characterized by a reflectivity that is lower in regions closer to a terminus of the edge than in regions further from the terminus.

9. The apparatus of claim 1 wherein the edge includes a phase mask having a first reflecting region and a second reflecting region, wherein light reflected from the first and reflecting regions experience different phase shift distributions upon reflection such that light reflecting from the first and second reflecting regions tend to cancel.

10. The apparatus of claim 1 wherein the edge is configured to increase a solid angle of scattering of light.

11. The apparatus of claim 10 wherein the edge is characterized by a rounded or shaped profile.

12. The apparatus of claim 1 wherein the edge features that protrude above a plane of the micromirror surface and/or are submerged below the plane of the micromirror surface include a first step feature along a first edge parallel to the attenuation axis and a second step feature along a second edge parallel to the attenuation axis, wherein the first step feature protrudes above the plane of the micromirror surface and the second step feature is submerged below the plane of the micromirror.

13. The apparatus of claim 12 wherein the first edge feature includes one or more first regions characterized by a first width $w_1$ measured from the first edge and one or more second regions characterized by a second width $w_2$ measured from the first edge.

14. The apparatus of claim 12 wherein the second edge feature includes one or more first regions characterized by a first width $w_1$ measured from the second edge and a one or more second regions characterized by a second width $w_2$ measured from the second edge.

15. The apparatus of claim 12 wherein the first edge feature includes one or more first regions characterized by a first width $w_1$ measured from the first edge and a one or more second regions characterized by a second width $w_2$ measured from the first edge and wherein the second edge feature includes one or more first regions characterized by a first width $w_1$ measured from the second edge and a one or more second regions characterized by a second width $w_2$ measured from the second edge.

16. The apparatus of claim 1 wherein the edge features that protrude above a plane of the micromirror surface and/or are submerged below the plane of the micromirror surface include a first plurality of step features disposed along a first edge parallel to the attenuation axis, and a second plurality of step features disposed along a second edge parallel to the attenuation axis, wherein each step feature in the first plurality protrudes above the plane of the micromirror surface and is separated from an adjacent step feature in the first plurality by a gap, and each step feature in the second plurality is submerged below the plane of the micromirror and is separated from an adjacent step feature in the second plurality by a gap.

17. The apparatus of claim 16 wherein each step feature in the first and second pluralities is characterized by a width w measured from the first and second edges respectively.

18. The apparatus of claim 17 wherein the width w varies among the step features in the first and second pluralities.

19. The apparatus of claim 17 wherein the width w varies among the step features in the first and second pluralities in a linear fashion along a length of the first and second edges.

20. The apparatus of claim 1 wherein the edge features that protrude above a plane of the micromirror surface and/or are submerged below the plane of the micromirror surface include a first step feature along a first edge parallel to the attenuation axis, a first plurality of step features disposed along the first edge, a second step feature along a second edge parallel to the attenuation axis, and a second plurality of step features disposed along a second edge parallel to the attenuation axis, wherein the first step feature protrudes above the plane of the micromirror surface, wherein each step feature in the first plurality protrudes above the plane of the micromirror surface and is separated from an adjacent step feature in the first plurality by a gap, wherein the second step feature is submerged below the plane of the micromirror, and wherein each step feature in the second plurality is submerged below the plane of the micromirror and is separated from an adjacent step feature in the second plurality by a gap.

21. The apparatus of claim 20 wherein the first and second step features are characterized by a width $w_1$ and each step feature in the first and second pluralities is characterized by a width $w_2$ measured from the first and second edges respectively.

22. The apparatus of claim 21 wherein the width $w_2$ varies among the step features in the first and second pluralities.

23. The apparatus of claim 22 wherein the width $w_2$ varies among the step features in the first and second pluralities in a linear fashion along a length of the first and second edges.

24. A micromirror apparatus for use in an optical apparatus, comprising:
an array of two or more micromirrors, each micromirror of the array being rotatable about a switching axis and an attenuation axis, wherein the attenuation axis is different from the switching axis,
wherein each micromirror of the array includes a reflective portion, wherein the reflective portion includes an edge that is substantially parallel to the attenuation axis,
wherein the edge includes one or more edge features that protrude above a plane of the micromirror surface and/or are submerged below the plane of the micromirror surface, and/or have an edge shape that deviates from a straight line in a way that reduces an increase in signal intensity of a spectral channel near side edges of a passband for a spectral channel reflected from the micromirror relative to a central portion of the passband due to diffraction of that spectral channel from the edge when the spectral channel is attenuated by rotating the channel micromirror about the attenuation axis.

25. The apparatus of claim 24, wherein the one or more edge features are configured to reduce effects of diffraction of a spectral beam reflected from the edge.

26. The apparatus of claim 24 wherein at least a portion of the edge has a vector component along the switching axis.

27. The apparatus of claim 26 wherein a portion of the edge has a sawtooth configuration.

28. The apparatus of claim 27 wherein the sawtooth configuration is characterized by sawtooth angle of between about 5 degrees and about 85 degrees relative to the attenuation axis.

29. The apparatus of claim 24 wherein the edge features include one or more features that protrude above a plane of the micromirror surface and/or are submerged below the plane of the micromirror surface by a distances equal to one-eighth of a wavelength of light that is likely to strike the mirror.

30. The apparatus of claim 24 wherein each of the features protrudes above (or are submerged below) the plane of the micromirror surface by a distance approximately equal to one-fourth of a wavelength of light that is likely to strike the mirror or an amount that causes destructive optical interference due to the presence of the features and the micromirror surface in such a way so as to eliminate or diminish diffraction from the edge region of the micromirror surface.

31. The apparatus of claim 24 wherein the edge includes a grey scale mask characterized by a reflectivity that is lower in regions closer to a terminus of the edge than in regions further from the terminus.

32. The apparatus of claim 24 wherein the edge includes a phase mask having a first reflecting region and a second reflecting region, wherein light reflected from the first and reflecting regions experience different phase shift distributions upon reflection such that light reflecting from the first and second reflecting regions tend to cancel.

33. The apparatus of claim 24 wherein the edge is configured to increase a solid angle of scattering of light.

34. The apparatus of claim 33 wherein the edge is characterized by a rounded or shaped profile.

35. The apparatus of claim 24 wherein the surface includes a pattern of raised or submerged portions.

36. The apparatus of claim 24 wherein the two or more micromirrors include two or more adjacent micromirrors, wherein a surface of each of the two or more adjacent micromirrors includes a pattern of raised or submerged portions, wherein the pattern on raised or submerged portions a first micromirror is an inverse of the pattern of raised or submerged portions on a second micromirror that is adjacent to the first micromirror, whereby raised portions on the first micromirror correspond to submerged portions on the second micromirror and vice versa.

37. The apparatus of claim 36 wherein each of the two or more adjacent micromirrors includes a submerged step along an edge parallel to an axis of attenuation.

38. The apparatus of claim 37 wherein the step is submerged below a plane of the micromirror surface by a distance equal to one-eighth of a wavelength of light of a spectral channel for the micromirror.

39. The apparatus of claim 24 wherein the edge features that protrude above a plane of the micromirror surface and/or are submerged below the plane of the micromirror surface include a first step feature along a first edge parallel to the attenuation axis and a second step feature along a second edge parallel to the attenuation axis, wherein the first step feature protrudes above the plane of the micromirror surface and the second step feature is submerged below the plane of the micromirror.

40. The apparatus of claim 39 wherein the first edge feature includes one or more first regions characterized by a first width $w_1$ measured from the first edge and a one or more second regions characterized by a second width $w_2$ measured from the first edge.

41. The apparatus of claim 39 wherein the second edge feature includes one or more first regions characterized by a first width $w_1$ measured from the second edge and a one or more second regions characterized by a second width $w_2$ measured from the second edge.

42. The apparatus of claim 39 wherein the first edge feature includes one or more first regions characterized by a first width $w_1$ measured from the first edge and a one or more second regions characterized by a second width $w_1+w_2$ measured from the first edge and wherein the second edge feature includes one or more first regions characterized by a first width $w_1$ measured from the second edge and a one or more second regions characterized by a second width $w_2$ measured from the second edge.

43. Optical apparatus for switching multi-channel optical signals having spectral channels of different wavelengths, comprising:

a plurality of input and output ports for optical signals having one or more of said spectral channels;

an optical beam expander and relay system adapted to receive the optical signals from one or more of the input ports, the optical beam expander and relay system being configured to convert the optical signals to spectral beams having a predetermined elongated beam profile;

a wavelength separator configured to spatially separate the spectral beams into constituent spectral channels; and an array of channel micromirrors, each channel micromirror of the array being positioned to receive one of said constituent spectral channels, the micromirrors being rotatable about a switching axis to switch said one spectral channel to a selected output port;

wherein each channel micromirror is rotatable about an attenuation axis to vary a coupling of a corresponding spectral channel to the selected output port to control a power level of the spectral channel output at such selected port, wherein the attenuation axis is different from the switching axis, wherein one or more of the channel micromirrors includes an edge that is substantially parallel to the attenuation axis, wherein the edge includes one or more edge features that protrude above a plane of the micromirror surface and/or are submerged below the plane of the micromirror surface, and/or have an edge shape that deviates from a straight line in a way that reduces an increase in signal intensity of a spectral channel near side edges of a passband for a spectral channel reflected from the micromirror relative to a central portion of the passband due to diffraction of that spectral channel from the edge when the spectral channel is attenuated by rotating the channel micromirror about the attenuation axis.

44. The apparatus of claim 43, wherein the one or more edge features are configured to reduce effects of diffraction of a spectral beam reflected from the edge.

45. The apparatus of claim 43 wherein the edge features include one or more features that protrude above a plane of the micromirror surface and/or are submerged below the plane of the micromirror surface by a distances equal to one-eighth of a wavelength of light that is likely to strike the mirror.

46. The apparatus of claim 43 wherein each of the features protrudes above (or are submerged below) the plane of the micromirror surface by a distance approximately equal to one-fourth of a wavelength of light that is likely to strike the mirror or an amount that causes destructive optical interference due to the presence of the features and the micromirror surface in such a way so as to eliminate or diminish diffraction from the edge.

47. The apparatus of claim 43 wherein the surface includes a pattern of raised or submerged portions.

48. The apparatus of claim 43 wherein the array of channel micromirrors includes two or more adjacent micromirrors, wherein a surface of each of the two or more adjacent micromirrors includes a pattern of raised or submerged portions, wherein the pattern on raised or submerged portions a first micromirror is an inverse of the pattern of raised or submerged portions on a second micromirror that is adjacent to the first micromirror, whereby raised portions on the first micromirror correspond to submerged portions on the second micromirror and vice versa.

49. The apparatus of claim 48 wherein each of the two or more adjacent micromirrors includes a submerged step along an edge parallel to an axis of attenuation.

50. The apparatus of claim 49 wherein the step is submerged below a plane of the micromirror surface by a distance equal to one-eighth of a wavelength of light of a spectral channel for the micromirror.

\* \* \* \* \*